United States Patent
Suehr et al.

(10) Patent No.: US 12,301,551 B2
(45) Date of Patent: May 13, 2025

(54) SYSTEM, METHOD, AND COMPUTER PROGRAM PRODUCT FOR GENERATING SECURE MESSAGES FOR MESSAGING

(71) Applicant: CybXSecurity LLC, McKeesport, PA (US)

(72) Inventors: Tyler Suehr, Greensburg, PA (US); Mycal Pedder, Manor, PA (US); Thomas Pedder, Jeannette, PA (US)

(73) Assignee: CYBXSECURITY LLC, McKeesport, PA (US)

( * ) Notice: Subject to any disclaimer, the term of this patent is extended or adjusted under 35 U.S.C. 154(b) by 240 days.

(21) Appl. No.: 17/824,366

(22) Filed: May 25, 2022

(65) Prior Publication Data

US 2023/0388280 A1    Nov. 30, 2023

(51) Int. Cl.
*H04L 9/40* (2022.01)
*H04L 9/08* (2006.01)
*H04L 9/32* (2006.01)

(52) U.S. Cl.
CPC ........ *H04L 63/0442* (2013.01); *H04L 9/0825* (2013.01); *H04L 9/3213* (2013.01); *H04L 9/3247* (2013.01)

(58) Field of Classification Search
CPC . H04L 63/0442; H04L 9/0825; H04L 9/3213; H04L 9/3247; H04L 9/0637; H04L 9/083
See application file for complete search history.

(56) References Cited

U.S. PATENT DOCUMENTS

| | | | | |
|---|---|---|---|---|
| 5,818,936 A * | 10/1998 | Mashayekhi | ........... | G06F 21/31 713/152 |
| 6,061,740 A * | 5/2000 | Ferguson | ............ | H04L 63/0823 709/248 |
| 6,272,538 B1 * | 8/2001 | Holden | ............... | H04W 12/069 709/227 |
| 6,760,752 B1 * | 7/2004 | Liu | ..................... | H04L 63/0435 |

(Continued)

FOREIGN PATENT DOCUMENTS

WO    WO-2016013924 A1 *    1/2016    ........... H04L 9/3231

OTHER PUBLICATIONS

"Advanced Encryption Standard", The Wayback Machine, Apr. 20, 2021, 15 pp.

(Continued)

*Primary Examiner* — Aravind K Moorthy
(74) *Attorney, Agent, or Firm* — The Webb Law Firm

(57) ABSTRACT

Provided are systems for generating secure messages for secure chat messaging that include a processor to receive an API request for a shared chat secret, determine whether a user is authorized for a chat messaging application based on the API request, transmit a request for an encrypted chat secret based on the API request, receive the encrypted chat secret, transmit the encrypted chat secret to a key management system (KMS), receive a chat secret from the KMS, wrap the chat secret according to an encryption algorithm using the user encryption key to provide a wrapped chat secret, generate an access token based on a session identifier, transmit the access token to the KMS, receive a signed access token from the KMS, and transmit the wrapped chat secret and the signed access token. Methods and computer program products are also disclosed.

60 Claims, 8 Drawing Sheets

(56) References Cited

U.S. PATENT DOCUMENTS

| | | | | |
|---|---|---|---|---|
| 9,292,711 | B1* | 3/2016 | Roth | G06F 21/34 |
| 9,596,274 | B2* | 3/2017 | Lawson | H04L 67/02 |
| 9,602,279 | B1* | 3/2017 | Tran | H04L 9/0866 |
| 9,608,810 | B1* | 3/2017 | Ghetti | H04L 63/0428 713/171 |
| 9,866,391 | B1* | 1/2018 | Crites | H04L 63/0442 |
| 10,623,186 | B1* | 4/2020 | Mehr | H04L 9/3226 |
| 10,963,593 | B1* | 3/2021 | Campagna | H04L 9/0861 |
| 11,025,598 | B1* | 6/2021 | Laghaeian | H04L 63/0435 |
| 11,100,197 | B1* | 8/2021 | Bernardi | H04L 9/14 |
| RE49,012 | E* | 4/2022 | Harkins | H04L 63/061 |
| 11,470,093 | B1* | 10/2022 | Lovell | H04L 9/0637 |
| 11,681,821 | B2* | 6/2023 | Baird, III | H04L 63/0442 713/168 |
| 11,847,244 | B1* | 12/2023 | Madan | G06N 3/045 |
| 11,887,129 | B1* | 1/2024 | Amir | H04L 63/08 |
| 2003/0055894 | A1* | 3/2003 | Yeager | H04L 67/1095 709/204 |
| 2004/0025019 | A1* | 2/2004 | Watanabe | H04L 9/3013 713/168 |
| 2004/0034776 | A1* | 2/2004 | Fernando | H04L 9/321 713/171 |
| 2004/0049687 | A1* | 3/2004 | Orsini | H04L 63/105 713/189 |
| 2004/0143438 | A1* | 7/2004 | Cabezas | G10L 21/00 704/260 |
| 2004/0168055 | A1* | 8/2004 | Lord | H04L 9/3247 713/156 |
| 2005/0039034 | A1* | 2/2005 | Doyle | H04L 9/0825 713/193 |
| 2005/0180572 | A1* | 8/2005 | Graunke | H04L 9/0891 380/277 |
| 2006/0045272 | A1* | 3/2006 | Ohaka | H04W 12/062 380/270 |
| 2007/0140488 | A1* | 6/2007 | Dharmaji | H04N 7/165 380/231 |
| 2007/0249375 | A1* | 10/2007 | Zapata | H04W 12/033 455/466 |
| 2008/0100945 | A1* | 5/2008 | Boyton | G11B 20/00253 360/48 |
| 2009/0010433 | A1* | 1/2009 | Schlomer | H04L 9/0861 380/278 |
| 2009/0132392 | A1* | 5/2009 | Davis | G06Q 20/40145 705/28 |
| 2009/0132813 | A1* | 5/2009 | Schibuk | G06Q 20/4014 726/9 |
| 2009/0208005 | A1* | 8/2009 | Kusakawa | H04L 9/3073 713/168 |
| 2010/0005319 | A1* | 1/2010 | Pohm | G06F 21/44 713/193 |
| 2010/0169656 | A1* | 7/2010 | Yoshida | H04L 9/3255 713/180 |
| 2010/0250924 | A1* | 9/2010 | Tsujimoto | H04L 9/3263 380/278 |
| 2010/0250936 | A1* | 9/2010 | Kusakawa | H04L 9/3278 713/169 |
| 2010/0306545 | A1* | 12/2010 | Seki | H04L 63/0823 709/206 |
| 2011/0179269 | A1* | 7/2011 | Furukawa | H04L 9/3255 713/156 |
| 2011/0197059 | A1* | 8/2011 | Klein | H04L 9/083 713/171 |
| 2011/0202764 | A1* | 8/2011 | Furukawa | H04L 9/0844 713/167 |
| 2011/0251923 | A1* | 10/2011 | Savilia | G06Q 30/0641 719/328 |
| 2011/0288973 | A1* | 11/2011 | Pazdziora | G06F 21/105 709/224 |
| 2012/0072723 | A1* | 3/2012 | Orsini | G06F 21/6218 713/165 |
| 2012/0198241 | A1* | 8/2012 | O'Hare | G06F 21/602 713/189 |
| 2012/0284516 | A1* | 11/2012 | Errico | G16H 80/00 713/168 |
| 2012/0331088 | A1* | 12/2012 | O'Hare | H04L 67/1097 709/214 |
| 2013/0013921 | A1* | 1/2013 | Bhathena | H04L 63/045 713/168 |
| 2013/0124866 | A1* | 5/2013 | Farrugia | H04L 9/0825 713/171 |
| 2014/0007222 | A1* | 1/2014 | Qureshi | H04L 67/10 726/16 |
| 2014/0089062 | A1* | 3/2014 | Chen | G07C 13/00 705/12 |
| 2014/0101444 | A1* | 4/2014 | Lee | H04L 63/06 713/168 |
| 2014/0164768 | A1* | 6/2014 | Kruglick | H04L 63/062 713/168 |
| 2014/0164779 | A1* | 6/2014 | Hartley | H04L 9/0866 713/176 |
| 2014/0164785 | A1* | 6/2014 | Ochiai | H04L 9/0816 713/189 |
| 2014/0201520 | A1* | 7/2014 | Yacobi | H04L 63/045 713/158 |
| 2014/0205092 | A1* | 7/2014 | Hartley | H04L 9/0877 380/44 |
| 2014/0270163 | A1* | 9/2014 | Merchan | H04L 9/0869 380/46 |
| 2014/0279461 | A1* | 9/2014 | Sims | G06Q 20/02 705/40 |
| 2014/0281506 | A1* | 9/2014 | Redberg | H04L 63/0442 713/159 |
| 2015/0269377 | A1* | 9/2015 | Gaddipati | G06F 21/44 726/30 |
| 2015/0281184 | A1* | 10/2015 | Cooley | G06F 16/9535 713/171 |
| 2016/0013933 | A1* | 1/2016 | Teranishi | H04L 9/0662 380/28 |
| 2016/0188887 | A1* | 6/2016 | Ghafourifar | G06F 21/6209 713/189 |
| 2016/0191472 | A1* | 6/2016 | Ghafourifar | H04L 9/088 713/167 |
| 2016/0192287 | A1* | 6/2016 | Yang | H04W 48/18 455/411 |
| 2016/0241389 | A1* | 8/2016 | Le Saint | H04L 9/14 |
| 2016/0254917 | A1* | 9/2016 | Cooley | G06F 16/22 713/171 |
| 2016/0269185 | A1* | 9/2016 | Stojanovski | H04W 8/005 |
| 2017/0161486 | A1* | 6/2017 | Jeon | H04L 63/067 |
| 2017/0195121 | A1* | 7/2017 | Frei | H04L 9/0825 |
| 2017/0230179 | A1* | 8/2017 | Mannan | H04L 9/3226 |
| 2017/0237717 | A1* | 8/2017 | Starosielsky | G06F 21/57 713/176 |
| 2018/0048464 | A1* | 2/2018 | Lim | H04L 63/0428 |
| 2018/0060604 | A1* | 3/2018 | Bent | H04L 9/30 |
| 2018/0075262 | A1* | 3/2018 | Auh | G06F 21/6227 |
| 2018/0145971 | A1* | 5/2018 | Mistry | H04L 63/0823 |
| 2018/0165781 | A1* | 6/2018 | Rodriguez | H04L 63/0807 |
| 2018/0176017 | A1* | 6/2018 | Rodriguez | H04L 63/20 |
| 2018/0239910 | A1* | 8/2018 | Isshiki | H04L 9/3231 |
| 2019/0058594 | A1* | 2/2019 | Kludy | H04L 9/321 |
| 2019/0147515 | A1* | 5/2019 | Hurley | G06Q 20/3821 705/44 |
| 2019/0166105 | A1* | 5/2019 | Romain | H04L 9/085 |
| 2019/0179806 | A1* | 6/2019 | Reinsberg | H04L 9/0643 |
| 2019/0230090 | A1* | 7/2019 | Kathiara | H04L 9/3247 |
| 2019/0250899 | A1* | 8/2019 | Riedl | H04L 9/0825 |
| 2019/0332691 | A1* | 10/2019 | Beadles | G06Q 20/3829 |
| 2019/0342096 | A1* | 11/2019 | Starosielsky | H04L 63/0428 |
| 2019/0356491 | A1* | 11/2019 | Herder, III | H04L 9/3242 |
| 2019/0356529 | A1* | 11/2019 | Gulati | H04L 9/3242 |
| 2019/0394032 | A1* | 12/2019 | Vudathu | H04L 63/0428 |
| 2020/0045029 | A1* | 2/2020 | Kidambi | H04L 12/4679 |
| 2020/0076595 | A1* | 3/2020 | Hathorn | H04L 9/3263 |
| 2020/0076807 | A1* | 3/2020 | Driever | H04L 9/085 |
| 2020/0082930 | A1* | 3/2020 | De Francesco | G16H 10/60 |
| 2020/0084027 | A1* | 3/2020 | Duchon | G06F 21/602 |
| 2020/0119917 | A1* | 4/2020 | Christensen | H04L 9/3239 |
| 2020/0134684 | A1* | 4/2020 | Culp | G06Q 30/0643 |

(56) References Cited

U.S. PATENT DOCUMENTS

| | | | | |
|---|---|---|---|---|
| 2020/0252208 | A1* | 8/2020 | Yoshida | H04L 9/3242 |
| 2020/0334229 | A1* | 10/2020 | Harrison | A61G 7/05 |
| 2020/0336895 | A1* | 10/2020 | Bartlett | H04L 9/3247 |
| 2020/0366462 | A1* | 11/2020 | Kolte | H04L 9/3242 |
| 2020/0387893 | A1* | 12/2020 | Maim | H04L 9/3247 |
| 2021/0012883 | A1* | 1/2021 | Bidulock | G16H 40/67 |
| 2021/0112048 | A1* | 4/2021 | Hirosawa | H04W 12/06 |
| 2021/0119776 | A1* | 4/2021 | Kleeberger | H04L 9/085 |
| 2021/0234681 | A1* | 7/2021 | Buendgen | H04L 9/0897 |
| 2021/0243177 | A1* | 8/2021 | Burson | H04L 63/0807 |
| 2021/0266303 | A1* | 8/2021 | Pollutro | H04L 63/0435 |
| 2021/0326459 | A1* | 10/2021 | Chivukula | H04L 9/3268 |
| 2021/0342836 | A1* | 11/2021 | Cella | H04L 9/3239 |
| 2021/0352055 | A1* | 11/2021 | Wane | H04L 9/0861 |
| 2021/0373854 | A1* | 12/2021 | Hill | G06F 7/588 |
| 2021/0377247 | A1* | 12/2021 | Nigro | H04L 9/3239 |
| 2021/0391040 | A1* | 12/2021 | Dormer | G16H 10/60 |
| 2022/0029790 | A1* | 1/2022 | Peddada | H04L 9/0891 |
| 2022/0060329 | A1* | 2/2022 | Goguin | H04L 9/50 |
| 2022/0150220 | A1* | 5/2022 | Verheyen | H04L 9/50 |
| 2023/0041959 | A1* | 2/2023 | Guccione | H04L 9/0866 |
| 2023/0208640 | A1* | 6/2023 | El Khiyaoui | H04L 9/3247 713/168 |
| 2023/0247010 | A1* | 8/2023 | O'Connell | H04L 9/065 713/151 |
| 2023/0315867 | A1* | 10/2023 | Bakshan | H04L 9/0825 713/189 |

OTHER PUBLICATIONS

"Cloak Communicator mobile application for Android", APKPure, Feb. 17, 2021, 6 pp.
"Digital Signature Algorithm", The Wayback Machine, Apr. 11, 2021, 7 pp.
"Elliptic-Curve Cryptography," The Wayback Machine, Apr. 15, 2021, 13 pp.
"Elliptic Curve Digital Signature Algorithm (ECDSA)", The Wayback Machine, Apr. 22, 2021, 9 pp.
"Edwards-Curve Digital Signature Algorithm (EdDSA)", The Wayback Machine, Apr. 22, 2021, 4 pp.
"Key Encapsulation Mechanism", The Wayback Machine, Apr. 6, 2021, 2 pp.
"Optimal Asymmetric Encryption Padding", The Wayback Machine, May 6, 2021, 3 pp.
"Recommendation for Pair-Wise Key Establishment Using Integer Factorization Cryptography", National Institute of Standards and Technology, Mar. 2019, 131 pp.
"RSA (cryptosystem)", The Wayback Machine, Apr. 30, 2021, 17 pp.
"Secure Hashing Algorithm 2 (SHA-2)", The Wayback Machine, Apr. 3, 2021, 10 pp.
"Secure Hashing Algorithm 3 (SHA-3)", The Wayback Machine, Apr. 13, 2021, 12 pp.
"Shamir's Secret Sharing", The Wayback Machine, Apr. 28, 2021, 7 pp.

* cited by examiner

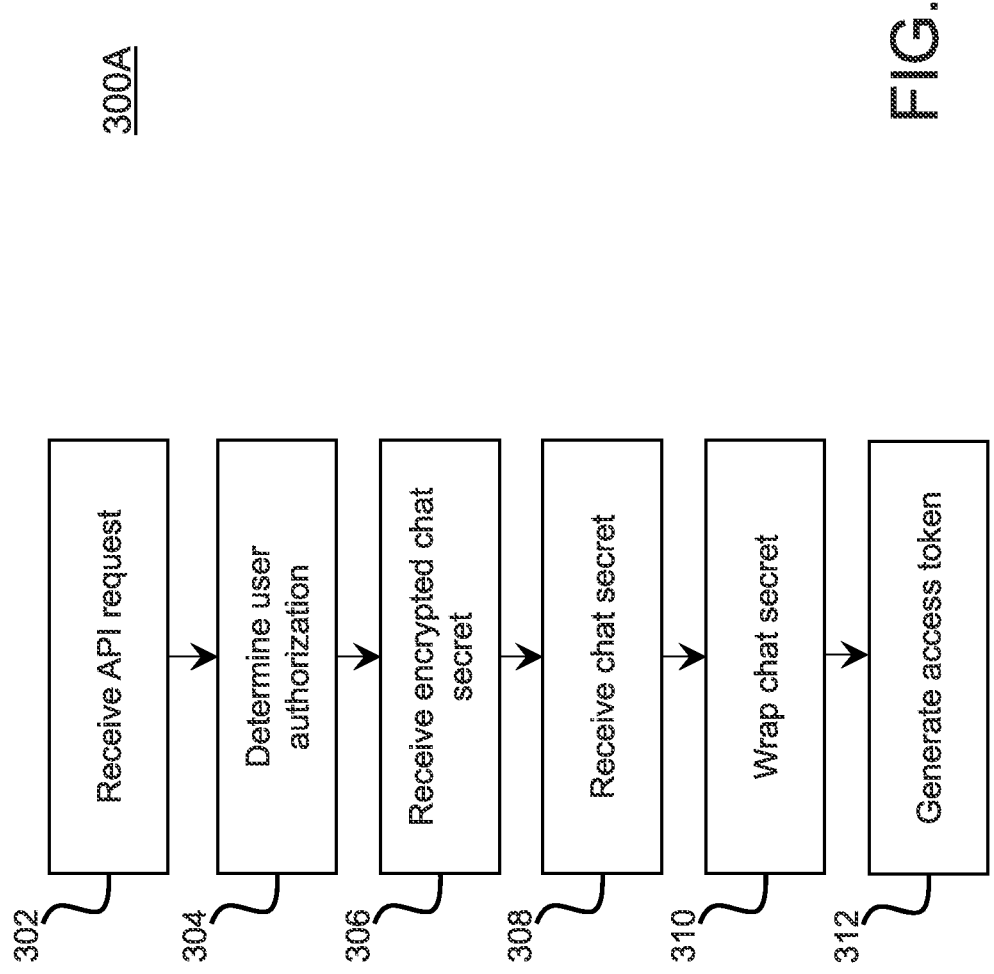

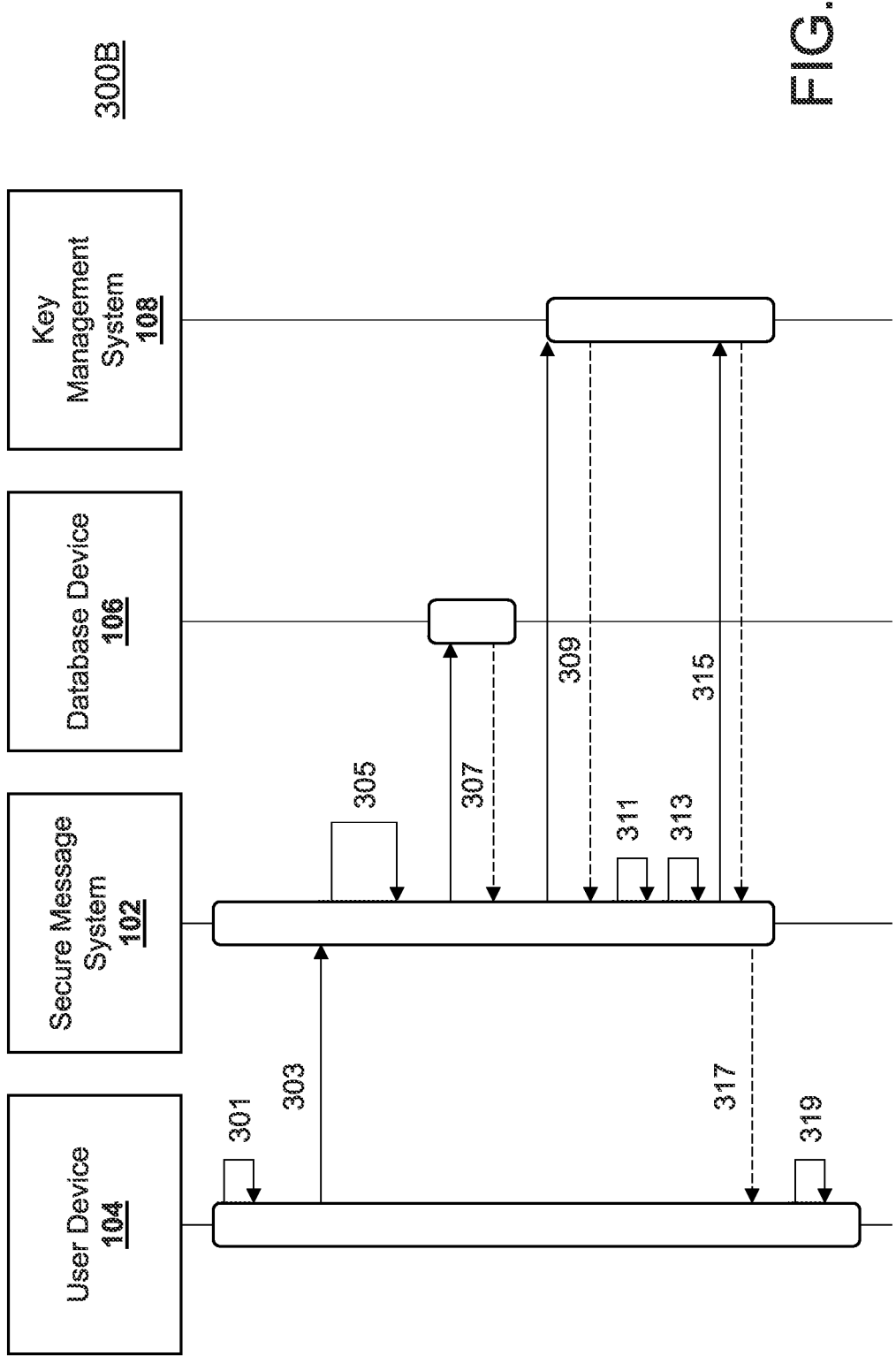

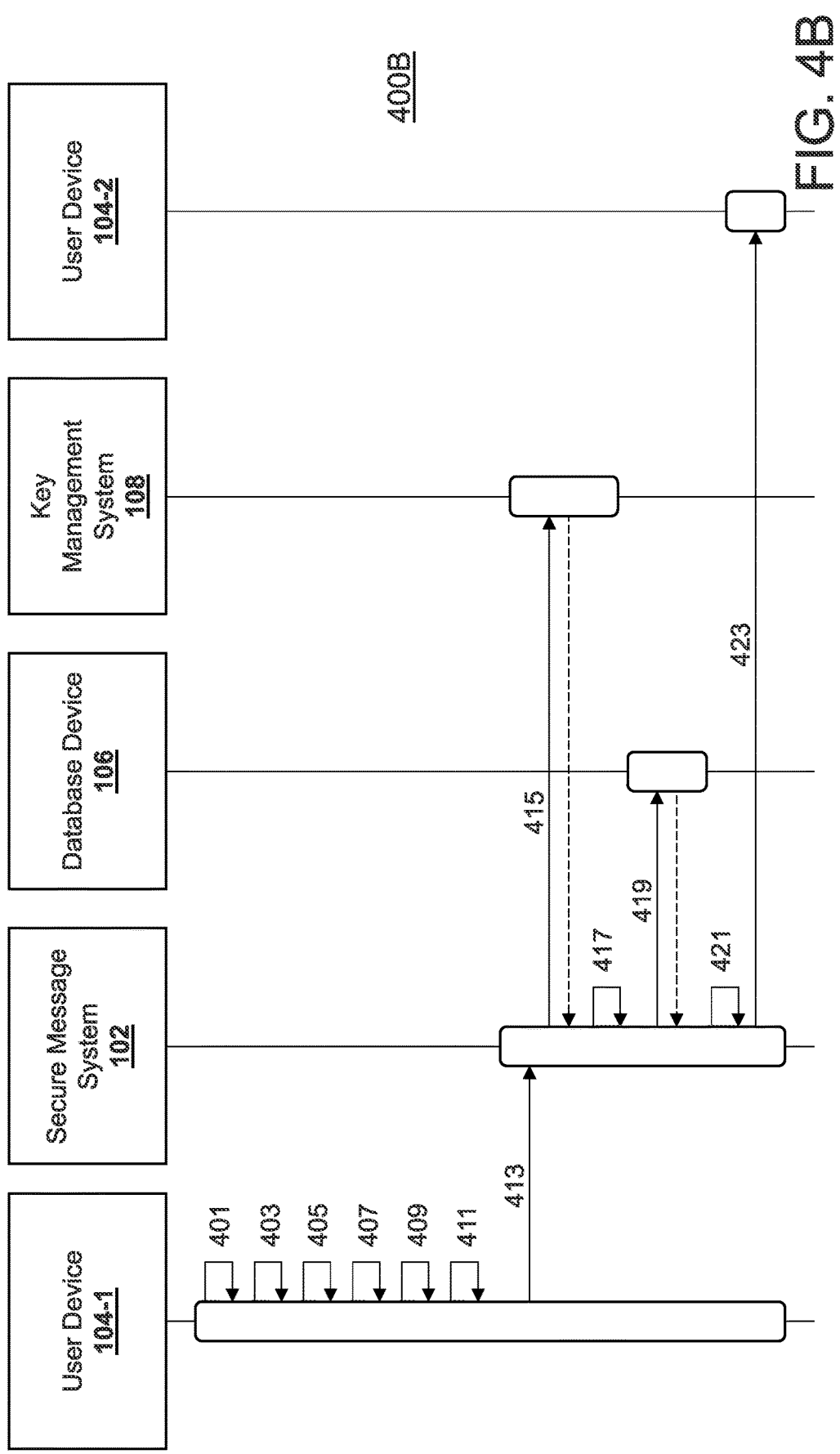

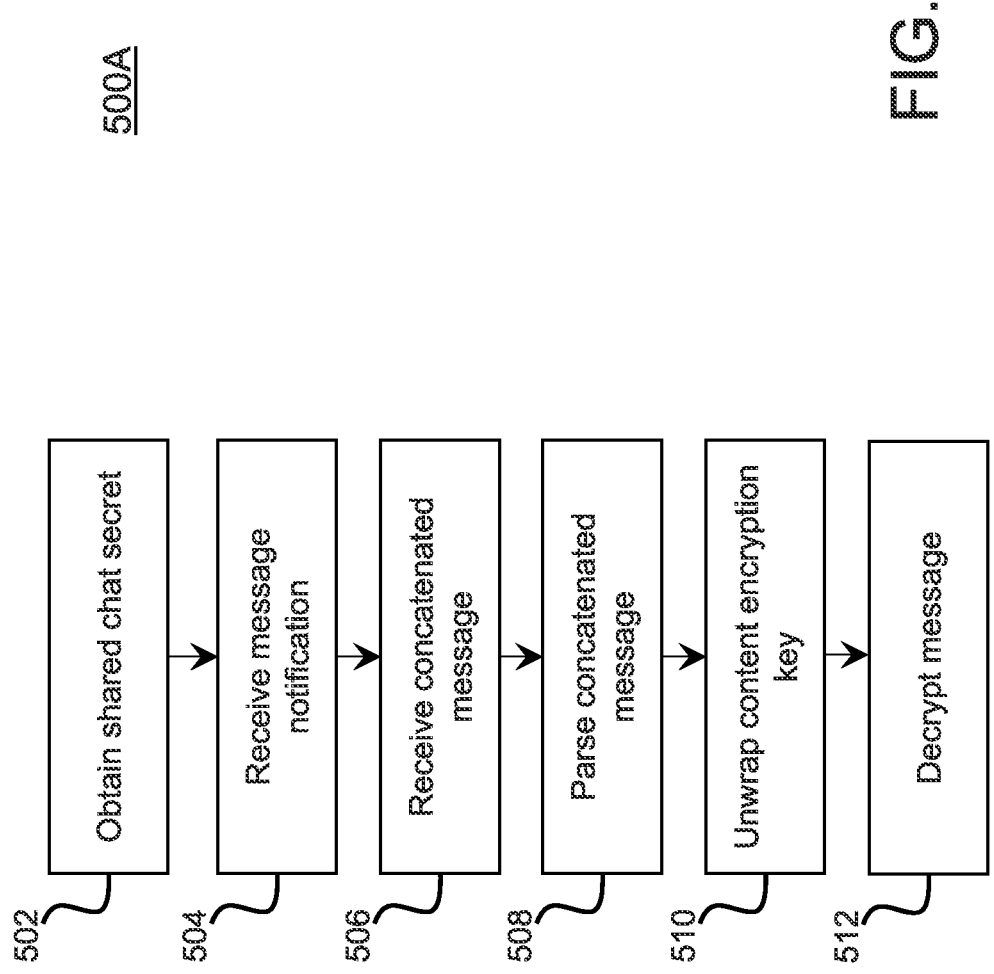

SYSTEM, METHOD, AND COMPUTER PROGRAM PRODUCT FOR GENERATING SECURE MESSAGES FOR MESSAGING

BACKGROUND

1. Field

This disclosure relates generally to real-time message transmissions and, in some non-limiting embodiments or aspects, to systems, methods, and computer program products for generating secure messages that are used during a session of a messaging application.

2. Technical Considerations

Online chat may refer to any kind of communication over the Internet that offers a real-time transmission of messages, such as text messages, from a sender to a receiver. The messages may generally be short to enable other receivers of a message to respond quickly. In some instances, a feeling similar to a spoken conversation is created, which distinguishes online chat from other online communication forms such as Internet forums and email. Online chat may use point-to-point communications as well as multicast communications from one sender to many receivers. In some instances, online chat may involve voice and/or video chat, and may be a feature of a web conferencing service.

Instant messaging (IM) technology may refer to a type of online chat that allows for real-time text transmission over a communication network, such as the Internet or another computer network. With IM technology, messages may be transmitted between two or more parties, when each sender inputs text for a message on a device and triggers a transmission to the recipients (e.g., receivers), who are all connected on a common network. IM applications (e.g., messaging applications, chat applications, social messengers, etc.) may be different from email in that conversations over IM applications may happen in real-time. In some instances, IM applications may use push technology and may also add other features such as emojis, file transfer, chatbots, Voice over IP (VOIP), or video chat capabilities.

Instant messaging systems tend to facilitate connections between specified known users (often using a contact list also known as a "buddy list" or "friend list"), and can be standalone applications or integrated into e.g., a wider social media platform, or a website where it can for instance be used for conversational commerce. IM can also consist of conversations in "chat rooms". Depending on the IM protocol, the technical architecture can be peer-to-peer (direct point-to-point transmission) or client—server (an IM service center retransmits messages from the sender to the communication device). It is usually distinguished from text messaging, which is typically simpler and normally uses cellular phone networks.

However, existing messaging applications may use schemes that are not fully secure and have been demonstrated that they can be breached and/or retain messages with plaintext. For example, existing messaging applications may rely on schemes that do not strongly guarantee authorization to access group-based messages and that do not strongly guarantee verifiability of authenticity or strict confidentiality and integrity of data-based encoded messages using a provisioned encryption key scheme which also includes strong authorization.

SUMMARY

Accordingly, disclosed are systems, methods, and computer program products for generating secure messages that are used during a session of a messaging application. Embodiments of the present application provide a portable way to send text and multimedia messages using strong cryptography practices and access control guarantees to protect the content of messages in a way that keeps the messages verifiably authentic, confidential, and/or tamper-proof that can be easily integrated into a mobile application.

Further embodiments are set forth in the following numbered clauses:

Clause 1: A method for generating a shared secret for secure chat messaging, comprising: receiving, with at least one processor, an application programming interface (API) request for a shared chat secret, wherein the API request comprises a user encryption key of a keypair; determining, with at least one processor, whether a user is authorized for a chat messaging application based on the API request, wherein determining whether the user is authorized for the chat messaging application comprises: checking access permissions of the user based on a token included in the API request; transmitting, with at least one processor, a request for an encrypted chat secret based on the API request; receiving, with at least one processor, the encrypted chat secret; transmitting, with at least one processor, the encrypted chat secret to a key management system (KMS), wherein the KMS is a hardened KMS such that no encryption keys are exported from the KMS; receiving, with at least one processor, a chat secret from the KMS, wherein the chat secret is a chat secret that has been generated by decrypting the encrypted chat secret; wrapping, with at least one processor, the chat secret according to an encryption algorithm using the user encryption key to provide a wrapped chat secret; generating, with at least one processor, an access token based on a session identifier; transmitting, with at least one processor, the access token to the KMS; receiving, with at least one processor, a signed access token from the KMS; and transmitting, with at least one processor, the wrapped chat secret and the signed access token. \

Clause 2: The method of clause 1, wherein the user encryption key of the keypair is a public key of a public/private encryption keypair, and wherein the method further comprising: generating public/private encryption keypair for shared secret; generate the API request for the shared secret, wherein the API request includes the public key of the public/private encryption keypair; and transmitting the API request for the shared secret.

Clause 3: The method of clauses 1 or 2, further comprising: retrieving the encrypted chat secret based on a chat identifier included in the API request.

Clause 4: The method of any of clauses 1-3, further comprising: receiving the wrapped chat secret and the signed access token; and decrypting the wrapped chat secret to provide the chat secret.

Clause 5: The method of any of clauses 1-4, wherein the user encryption key of the keypair is a public key of a public/private encryption keypair, and wherein decrypting the wrapped chat secret to provide the chat secret comprises: decrypting the wrapped chat secret to provide the chat secret using a private key of the public/private encryption keypair.

Clause 6: The method of any of clauses 1-5, further comprising: determining whether the encrypted chat secret is authorized; and decrypting the encrypted chat secret based on determining that the encrypted chat secret is authorized.

Clause 7: The method of any of clauses 1-6, further comprising: destroying the keypair following an event associated with a chat session.

Clause 8: A system for generating a shared secret for secure chat messaging, comprising: at least one processor;

wherein the at least one processor is programmed or configured to: receive an application programming interface (API) request for a shared chat secret, wherein the API request comprises a user encryption key of a keypair; determine whether a user is authorized for a chat messaging application based on the API request, wherein, when determining whether the user is authorized for the chat messaging application, the at least one processor is programmed or configured to: check access permissions of the user based on a token included in the API request; transmit a request for an encrypted chat secret based on the API request; receive the encrypted chat secret; transmit the encrypted chat secret to a key management system (KMS), wherein the KMS is a hardened KMS such that no encryption keys are exported from the KMS; receive a chat secret from the KMS, wherein the chat secret is a chat secret that has been generated by decrypting the encrypted chat secret; wrap the chat secret according to an encryption algorithm using the user encryption key to provide a wrapped chat secret; generate an access token based on a session identifier; transmit the access token to the KMS; receive a signed access token from the KMS; and transmit the wrapped chat secret and the signed access token.

Clause 9: The system of clause 8, wherein the user encryption key of the keypair is a public key of a public/private encryption keypair, and wherein the at least one processor is further programmed or configured to: generate the public/private encryption keypair for the shared secret; generate the API request for the shared secret, wherein the API request includes the public key of the public/private encryption keypair; and transmit the API request for the shared secret.

Clause 10: The system of clauses 8 or 9, wherein the at least one processor is further programmed or configured to: retrieve the encrypted chat secret based on a chat identifier included in the API request.

Clause 11: The system of any of clauses 8-10, wherein the at least one processor is further programmed or configured to: receive the wrapped chat secret and the signed access token; and decrypt the wrapped chat secret to provide the chat secret.

Clause 12: The system of any of clauses 8-11, wherein the user encryption key of the keypair is a public key of a public/private encryption keypair, and wherein, when decrypting the wrapped chat secret to provide the chat secret, the at least one processor is programmed or configured to: decrypt the wrapped chat secret to provide the chat secret using a private key of the public/private encryption keypair.

Clause 13: The system of any of clauses 8-12, wherein the at least one processor is further programmed or configured to: determine whether the encrypted chat secret is authorized; and decrypt the encrypted chat secret based on determining that the encrypted chat secret is authorized.

Clause 14: The system of any of clauses 8-13, wherein the at least one processor is further programmed or configured to: destroy the keypair following an event associated with a chat session.

Clause 15: A computer program product for generating a shared secret for secure chat messaging, the computer program product comprising at least one non-transitory computer-readable medium including one or more instructions that, when executed by at least one processor, cause the at least one processor to: receive an application programming interface (API) request for a shared chat secret, wherein the API request comprises a user encryption key of a keypair; determine whether a user is authorized for a chat messaging application based on the API request, wherein, when determining whether the user is authorized for the chat messaging application, the at least one processor is programmed or configured to: check access permissions of the user based on a token included in the API request; transmit a request for an encrypted chat secret based on the API request; receive the encrypted chat secret; transmit the encrypted chat secret to a key management system (KMS), wherein the KMS is a hardened KMS such that no encryption keys are exported from the KMS; receive a chat secret from the KMS, wherein the chat secret is a chat secret that has been generated by decrypting the encrypted chat secret; wrap the chat secret according to an encryption algorithm using the user encryption key to provide a wrapped chat secret; generate an access token based on a session identifier; transmit the access token to the KMS; receive a signed access token from the KMS; and transmit the wrapped chat secret and the signed access token.

Clause 16: The computer program product of clause 15, wherein the user encryption key of the keypair is a public key of a public/private encryption keypair, and wherein the one or more instructions further cause the at least one processor to: generate the public/private encryption keypair for the shared secret; generate the API request for the shared secret, wherein the API request includes the public key of the public/private encryption keypair; and transmit the API request for the shared secret.

Clause 17: The computer program product of clauses 15 or 16, wherein the one or more instructions further cause the at least one processor to: retrieve the encrypted chat secret based on a chat identifier included in the API request.

Clause 18: The computer program product of any of clauses 15-17, wherein the one or more instructions further cause the at least one processor to: receive the wrapped chat secret and the signed access token; and decrypt the wrapped chat secret to provide the chat secret.

Clause 19: The computer program product of any of clauses 15-18, wherein the user encryption key of the keypair is a public key of a public/private encryption keypair, and wherein, when decrypting the wrapped chat secret to provide the chat secret, the one or more instructions cause the at least one processor to: decrypt the wrapped chat secret to provide the chat secret using a private key of the public/private encryption keypair.

Clause 20: The computer program product of any of clauses 15-19, wherein the one or more instructions further cause the at least one processor to: determine whether the encrypted chat secret is authorized; and decrypt the encrypted chat secret based on determining that the encrypted chat secret is authorized.

Clause 21: The computer program product of any of clauses 15-20, wherein the one or more instructions further cause the at least one processor to: destroy the keypair following an event associated with a chat session.

Clause 22: A method for encrypting a message for secure chat messaging, comprising: obtaining, with at least one processor, a shared chat secret; receiving, with at least one processor, a plaintext message; generating, with at least one processor, a content encryption key for the shared chat secret; encrypting, with at least one processor, the plaintext message according to a first encryption algorithm using the content encryption key to provide an encrypted message; wrapping, with at least one processor, the content encryption key according to a second encryption algorithm with the shared chat secret to provide a wrapped content encryption key; concatenating, with at least one processor, the wrapped content encryption key and the encrypted message to provide a concatenated message; and transmitting, with at least one processor, an application programming interface (API) request that includes the concatenated message.

Clause 23: The method of clause 22, further comprising: determining whether a user is authorized for a chat messaging application based on an access token included the API request, wherein determining whether the user is authorized for the chat messaging application comprises: transmitting an authorization request to a key management system (KMS), wherein the authorization request comprises the access token included in the API request.

Clause 24: The method of clauses 22 or 23, further comprising: verifying a signature of the access token included in the authorization request; and transmitting an authorization confirmation response based on verifying the signature of the access token.

Clause 25: The method of any of clauses 22-24, further comprising: authorizing activity for a chat session based on a chat identifier, wherein authorizing activity for the chat session comprises: reading a token claim of the access token, wherein the token claim comprises a key value pair; and determining that the activity for the chat session is authorized based on the chat identifier and the key value pair.

Clause 26: The method of any of clauses 22-25, further comprising: receiving the API request; and storing the concatenated message based on a chat identifier of the concatenated message and a timestamp associated with the concatenated message.

Clause 27: The method of any of clauses 22-26, further comprising: transmitting a push notification associated with the concatenated message, wherein the push notification includes a unique identifier associated with the chat identifier of the concatenated message.

Clause 28: A system for encrypting a message for secure chat messaging, comprising: at least one processor; wherein the at least one processor is programmed or configured to: obtain a shared chat secret; receive a plaintext message; generate a content encryption key for the shared chat secret; encrypt the plaintext message according to a first encryption algorithm using the content encryption key to provide an encrypted message; wrap the content encryption key according to a second encryption algorithm with the shared chat secret to provide a wrapped content encryption key; concatenate the wrapped content encryption key and the encrypted message to provide a concatenated message; and transmit an application programming interface (API) request that includes the concatenated message.

Clause 29: The system of clause 28, wherein the at least one processor is further programmed or configured to: determine whether a user is authorized for a chat messaging application based on an access token included the API request, wherein, when determining whether the user is authorized for the chat messaging application, the at least one processor is programmed or configured to: transmit an authorization request to a key management system (KMS), wherein the authorization request comprises the access token included in the API request.

Clause 30: The system of clauses 28 or 29, wherein the at least one processor is further programmed or configured to: verify a signature of the access token included in the authorization request; and transmit an authorization confirmation response based on verifying the signature of the access token.

Clause 31: The system of any of clauses 28-30, wherein the at least one processor is further programmed or configured to: authorize activity for a chat session based on a chat identifier, wherein, when authorizing activity for the chat session, the at least one processor is programmed or configured to: read a token claim of the access token, wherein the token claim comprises a key value pair; and determine that the activity for the chat session is authorized based on the chat identifier and the key value pair.

Clause 32: The system of any of clauses 28-31, wherein the at least one processor is further programmed or configured to: receive the API request; and store the concatenated message based on a chat identifier of the concatenated message and a timestamp associated with the concatenated message.

Clause 33: The system of any of clauses 28-32, wherein the at least one processor is further programmed or configured to: transmit a push notification associated with the concatenated message, wherein the push notification includes a unique identifier associated with the chat identifier of the concatenated message.

Clause 34: A computer program product for encrypting a message for secure chat messaging, the computer program product comprising at least one non-transitory computer-readable medium including one or more instructions that, when executed by at least one processor, cause the at least one processor to: obtain a shared chat secret; receive a plaintext message; generate a content encryption key for the shared chat secret; encrypt the plaintext message according to a first encryption algorithm using the content encryption key to provide an encrypted message; wrap the content encryption key according to a second encryption algorithm with the shared chat secret to provide a wrapped content encryption key; concatenate the wrapped content encryption key and the encrypted message to provide a concatenated message; and transmit an application programming interface (API) request that includes the concatenated message.

Clause 35: The computer program product of clause 34, wherein the one or more instructions further cause the at least one processor to: determine whether a user is authorized for a chat messaging application based on an access token included the API request, wherein, when determining whether the user is authorized for the chat messaging application, the one or more instructions cause the at least one processor to: transmit an authorization request to a key management system (KMS), wherein the authorization request comprises the access token included in the API request.

Clause 36: The computer program product of clauses 34 or 35, wherein the one or more instructions further cause the at least one processor to: verify a signature of the access token included in the authorization request; and transmit an authorization confirmation response based on verifying the signature of the access token.

Clause 37: The computer program product of any of clauses 34-36, wherein the one or more instructions further cause the at least one processor to: authorize activity for a chat session based on a chat identifier, wherein, when authorizing activity for the chat session, the one or more instructions cause the at least one processor to: read a token claim of the access token, wherein the token claim comprises a key value pair; and determine that the activity for the chat session is authorized based on the chat identifier and the key value pair.

Clause 38: The computer program product of any of clauses 34-37, wherein the one or more instructions further cause the at least one processor to: receive the API request; and store the concatenated message based on a chat identifier of the concatenated message and a timestamp associated with the concatenated message.

Clause 39: The computer program product of any of clauses 34-38, wherein the one or more instructions further cause the at least one processor to: transmit a push notification associated with the concatenated message, wherein the push notification includes a unique identifier associated with the chat identifier of the concatenated message.

Clause 40: A method for decrypting a message for secure chat messaging, comprising: obtaining, with at least one processor, a shared chat secret; receiving a message notification associated with an encrypted message, wherein the message notification includes a unique identifier associated with the encrypted message; transmitting, with at least one processor, a message request, wherein the message request includes the unique identifier associated with the encrypted message; receiving, with at least one processor, a concatenated message based on the message request; parsing, with at least one processor, the concatenated message to provide an encrypted message and a wrapped content encryption key; unwrapping, with at least one processor, the wrapped content encryption key according to a first encryption algorithm with the shared chat secret to provide an unwrapped content encryption key; and decrypting, with at least one processor, the encrypted message according to a second encryption algorithm using the unwrapped content encryption key to provide a plaintext message.

Clause 41: The method of clause 40, further comprising: verifying a signature of an access token included in the message request; and transmitting an authorization confirmation response based on verifying the signature of the access token.

Clause 42: The method of clauses 40 or 41, further comprising: processing the plaintext message.

Clause 43: The method of any of clauses 40-42, further comprising: authorizing activity for a chat session based on the unique identifier associated with the encrypted message, wherein authorizing activity for the chat session comprises: reading a token claim of an access token included in the message request, wherein the token claim comprises a key value pair; and determining that the activity for the chat session is authorized based on the unique identifier and the key value pair.

Clause 44: The method of any of clauses 40-43, wherein authorizing the activity for the chat session comprises: authorizing, with at least one processor of a messaging application programming interface (API) server, the activity for the chat session.

Clause 45: The method of any of clauses 40-44, wherein receiving the message notification associated with the encrypted message comprises: receiving the message notification associated with the encrypted message from a notification application programming interface (API) server.

Clause 46: The method of any of clauses 40-45, further comprising: retrieving the concatenated message from a database based on a chat identifier of the concatenated message, the unique identifier associated with the encrypted message, or any combination thereof.

Clause 47: A system for decrypting a message for secure chat messaging, comprising: at least one processor; wherein the at least one processor is programmed or configured to: obtain a shared chat secret; receive a message notification associated with an encrypted message, wherein the message notification includes a unique identifier associated with the encrypted message; transmit a message request, wherein the message request includes the unique identifier associated with the encrypted message; receive a concatenated message based on the message request; parse the concatenated message to provide an encrypted message and a wrapped content encryption key; unwrap the wrapped content encryption key according to a first encryption algorithm with the shared chat secret to provide an uwrapped content encryption key; and decrypt the encrypted message according to a second encryption algorithm using the unwrapped content encryption key to provide a plaintext message.

Clause 48: The system of clause 47, wherein the at least one processor is further programmed or configured to: verify a signature of an access token included in the message request; and transmit an authorization confirmation response based on verifying the signature of the access token.

Clause 49: The system of clauses 47 or 48, wherein the at least one processor is further programmed or configured to: process the plaintext message.

Clause 50: The system of any of clauses 47-49, wherein the at least one processor is further programmed or configured to: authorize activity for a chat session based on the unique identifier associated with the encrypted message, wherein, when authorizing activity for the chat session, the at least one processor is programmed or configured to: read a token claim of an access token included in the message request, wherein the token claim comprises a key value pair; and determine that the activity for the chat session is authorized based on the unique identifier and the key value pair.

Clause 51: The system of any of clauses 47-50, wherein, when authorizing the activity for the chat session, the at least one processor is programmed or configured to: authorize, with at least one processor of a messaging application programming interface (API) server, the activity for the chat session.

Clause 52: The system of any of clauses 47-51, wherein, when receiving the message notification associated with the encrypted message, the at least one processor is programmed or configured to: receive the message notification associated with the encrypted message from a notification application programming interface (API) server.

Clause 53: The system of any of clauses 47-52, wherein the at least one processor is further programmed or configured to: retrieve the concatenated message from a database based on a chat identifier of the concatenated message, the unique identifier associated with the encrypted message, or any combination thereof.

Clause 54: A computer program product for decrypting a message for secure chat messaging, the computer program product comprising at least one non-transitory computer-readable medium including one or more instructions that, when executed by at least one processor, cause the at least one processor to: obtaining a shared chat secret; receive a message notification associated with an encrypted message, wherein the message notification includes a unique identifier associated with the encrypted message; transmit a message request, wherein the message request includes the unique identifier associated with the encrypted message; receive a concatenated message based on the message request; parse the concatenated message to provide an encrypted message and a wrapped content encryption key; unwrap the wrapped content encryption key according to a first encryption algorithm with the shared chat secret to provide an uwrapped content encryption key; and decrypt the encrypted message according to a second encryption algorithm using the unwrapped content encryption key to provide a plaintext message.

Clause 55: The computer program product of clause 54, wherein the one or more instructions further cause the at least one processor to: verify a signature of an access token included in the message request; and transmit an authorization confirmation response based on verifying the signature of the access token.

Clause 56: The computer program product of clauses 54 or 55, wherein the one or more instructions further cause the at least one processor to: process the plaintext message.

Clause 57: The computer program product of any of clauses 54-56, wherein the one or more instructions further cause the at least one processor to: authorize activity for a chat session based on the unique identifier associated with the encrypted message, wherein authorizing activity for the chat session comprises: read a token claim of an access token included in the message request, wherein the token claim comprises a key value pair; and determine that the activity for the chat session is authorized based on the unique identifier and the key value pair.

Clause 58: The computer program product of any of clauses 54-57, wherein, when authorizing the activity for the chat session, the one or more instructions cause the at least one processor to: authorize, with at least one processor of a messaging application programming interface (API) server, the activity for the chat session.

Clause 59: The computer program product of any of clauses 54-58, wherein, when receiving the message notification associated with the encrypted message, the one or more instructions cause the at least one processor to: receive the message notification associated with the encrypted message from a notification messaging application programming interface (API) server.

Clause 60: The computer program product of any of clauses 54-59, wherein the one or more instructions further cause the at least one processor to: retrieve the concatenated message from a database based on a chat identifier of the concatenated message, the unique identifier associated with the encrypted message, or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIG. 3A is a flowchart of a non-limiting embodiment of a process for generating a shared secret for secure chat messaging;

FIG. 3B is a diagram of a non-limiting embodiment of an implementation of a process for generating a shared secret for secure chat messaging;

FIG. 4B is a diagram of a non-limiting embodiment of an implementation of a process for encrypting a message for secure chat messaging;

FIG. 5A is a flowchart of a non-limiting embodiment of a process for decrypting a message for secure chat messaging.

DESCRIPTION

Figure 1:
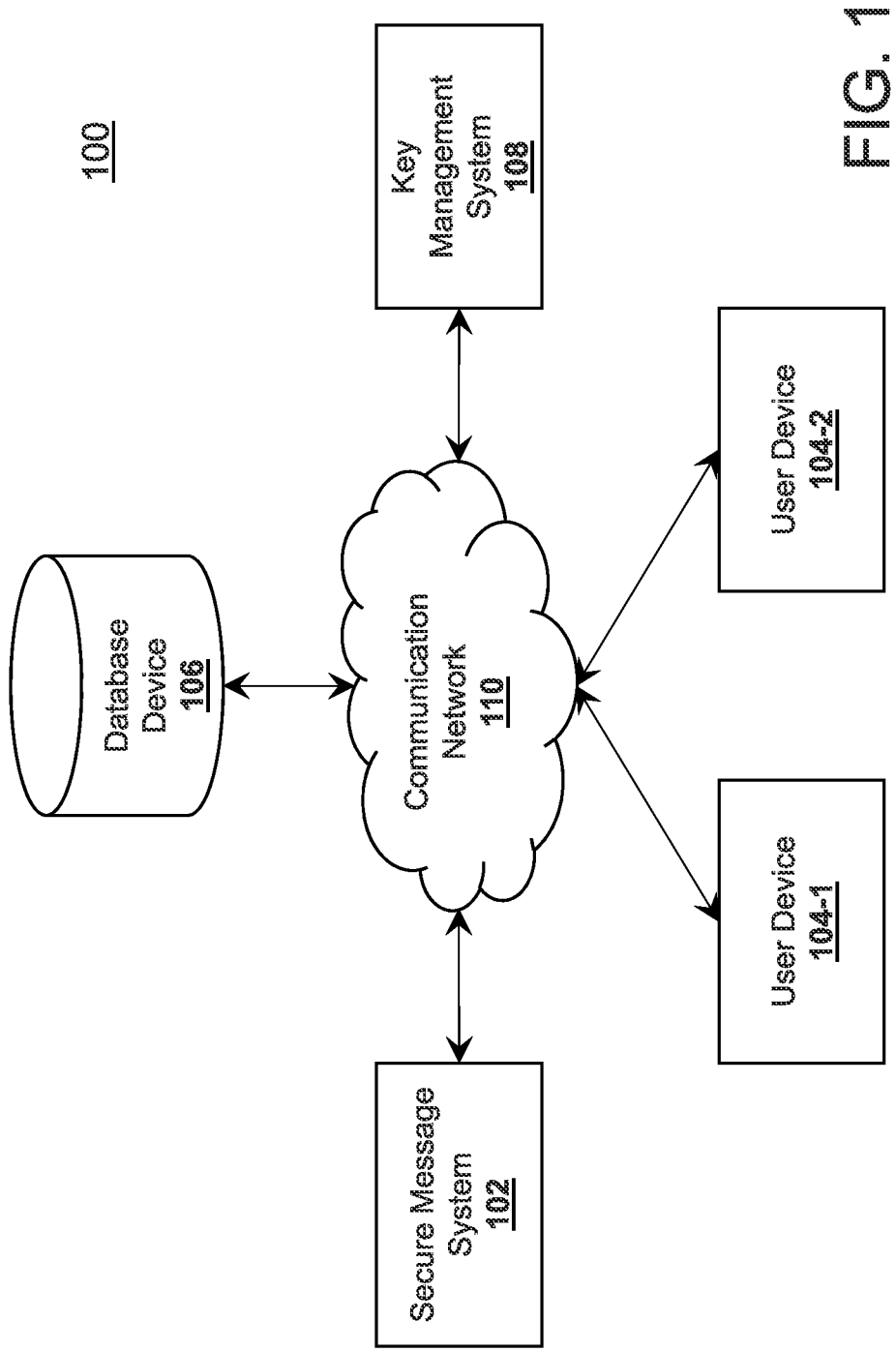
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are systems, methods, and computer program products for generating secure messages that are used during a session of a messaging application. Embodiments of the present disclosure may include a secure message system that is programmed or configured to: receive an application programming interface (API) request for a shared chat secret and the API request includes a user encryption key of a keypair, determine whether a user is authorized for a chat messaging application based on the API request. In some non-limiting embodiments, when determining whether the user is authorized for the chat messaging application, the secure message system is programmed or configured to: check access permissions of the user based on a token included in the API request. In some non-limiting embodiments, the secure message system is programmed or configured to: transmit a request for an encrypted chat secret based on the API request, receive the encrypted chat secret, transmit the encrypted chat secret to a key management system (KMS), and the KMS is a hardened KMS such that no encryption keys are exported from the KMS, receive a chat secret from the KMS, wherein the chat secret is a chat secret that has been generated by decrypting the encrypted chat secret, wrap the chat secret according to an encryption algorithm using the user encryption key to provide a wrapped chat secret, generate an access token based on a session identifier, and transmit the access token to the KMS. In some non-limiting embodiments, the secure message system is programmed or configured to: receive a signed access token from the KMS; and transmit the wrapped chat secret and the signed access token.

In some non-limiting embodiments, the secure message system is programmed or configured to: obtain a shared chat secret, receive a plaintext message, generate a content encryption key for the shared chat secret, encrypt the plaintext message according to a first encryption algorithm using the content encryption key to provide an encrypted message, wrap the content encryption key according to a second encryption algorithm with the shared chat secret to provide a wrapped content encryption key, concatenate the wrapped content encryption key and the encrypted message to provide a concatenated message, and transmit an API request that includes the concatenated message.

In some non-limiting embodiments, the secure message system is programmed or configured to: obtain a shared chat secret; receive a message notification associated with an encrypted message, wherein the message notification includes a unique identifier associated with the encrypted message; transmit a message request, wherein the message request includes the unique identifier associated with the encrypted message; receive a concatenated message based on the message request; parse the concatenated message to provide an encrypted message and a wrapped content encryption key; unwrap the wrapped content encryption key according to a first encryption algorithm with the shared chat secret to provide an uwrapped content encryption key; and decrypt the encrypted message according to a second encryption algorithm using the unwrapped content encryption key to provide a plaintext message.

In this way, the secure message system may provide a secure messaging procedure that may use schemes that strongly guarantees authorization to access group-based messages and guarantees verifiability of authenticity, strict confidentiality, and integrity of data-based encoded messages using a provisioned key wrapping scheme and that may be integrated into a mobile application.

Referring now to FIG. 1, FIG. 1 is a diagram of an example environment 100 in which devices, systems, methods, and/or products described herein may be implemented. As shown in FIG. 1, environment 100 includes secure message system 102, user device 104-1 and user device 104-2 (referred to individually as user device 104 and collectively as user devices 104 where appropriate), database device 106, key management system (KMS) 108, and communication network 110. Secure message system 102, user devices 104, database device 106, and KMS 108 may interconnect (e.g., establish a connection to communicate, and/or the like) via wired connections, wireless connections, or a combination of wired and wireless connections. User device 104-1 and user device 104-2 may be referred to collectively as user devices 104 and/or referred to individually as user device 104 as appropriate.

Communication between the components shown in FIG. 1 may include the use of protocols for specified purposes including, a shared chat secret acquisition protocol, an authenticated message encryption protocol, and/or an authenticated message decryption protocol, and may be based on (e.g., involve the use of) Transmission Control Protocol (TCP) and/or Hyper-Text Transfer Protocol (HTTP), or an established token-based authorization protocol (e.g., JavaScript Object Notation (JSON) web token (JWT)).

Additionally or alternatively, communication between the components shown in FIG. 1 may involve a content API, a message API, KMS API, a mobile application, a content database, and/or a message database. In some non-limiting embodiments, the content API and the message API may allow for direct communication with the KMS API.

Secure message system 102 may include one or more computing devices configured to communicate with user devices 104, database device 106, and/or KMS 108 via communication network 110. For example, secure message system 102 may include a group of servers and/or other like devices. In some non-limiting embodiments, secure message system 102 may be associated with (e.g., operated by) a user device, as described herein. Additionally or alternatively, secure message system 102 may be a component of a user device. In some non-limiting embodiments, secure message system 102 may include KMS 108. In some non-limiting embodiments, secure message system 102 may receive data and/or messages from database device 106. In some non-limiting embodiments, secure message system 102 may include a message API, a message API server, a notification API, and/or a notification API server. In some non-limiting embodiments, secure message system 102 may be database-agnostic (e.g., secure message system 102 may function with any database and/or database management system and secure message system 102 does not need to be customized to function with different database systems). For example, a military grade database may enforce its own encryption method at the row or table level. This military grade database may still function properly with secure message system 102 without requiring any additional changes to secure message system 102 or to the military grade database because secure message system 102 is database-agnostic and will work with any database.

User devices 104 may include one or more computing devices configured to communicate with secure message system 102, database device 106, and/or KMS 108 via communication network 110. For example, user devices 104 may include a desktop computer (e.g., a client device that communicates with a server), a mobile device, and/or the like. In some non-limiting embodiments, user devices 104 may be associated with a user (e.g., an individual operating a device). User devices 104 may include a chat messaging application executing on user devices 104 that is associated with secure message system 102.

Database device 106 may include one or more databases used for storing data and/or messages. Database device 106 may be updated with new data via communication network 110. Database device 106 may be configured to communicate with secure message system 102 and/or user devices 104 via communication network 110. In some non-limiting embodiments, database device 106 may communicate with secure message system 102 regardless of the type of database structure included in database device 106 (e.g., relational databases, NoSQL databases, and/or the like).

KMS 108 may include a secure vault component (e.g., a secure server). In some non-limiting embodiments, KMS 108 may generate keys (e.g., keys for decryption) which are stored exclusively on KMS 108 and are not exported to other devices and/or applications. KMS 108 may be secured by a secure cryptography mechanism (e.g., Shamir's Secret Sharing (SSS)).

Communication network 110 may include one or more wired and/or wireless networks. For example, communication network 110 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 is provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
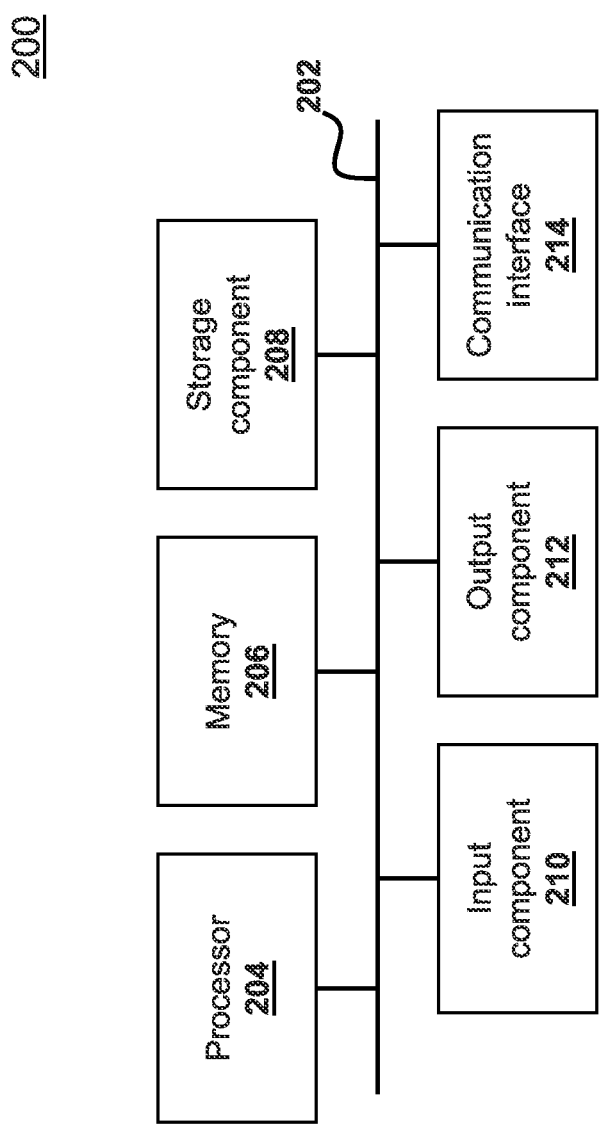
FIG. 2 is a diagram of a non-limiting embodiment of components of one or more devices and/or one or more systems of FIG. 1.

Referring now to FIG. 2, FIG. 2 is a diagram of example components of device 200. Device 200 may correspond to secure message system 102 (e.g., one or more devices of secure message system 102), user devices 104, database device 106, and/or KMS 108. In some non-limiting embodiments, secure message system 102, user devices 104, database device 106, and/or KMS 108 may include at least one device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some non-limiting embodiments, storage component 208 may be the same as or similar to database device 106.

Input component 210 may include a component that permits device 200 to receive information, such as via user input (e.g., a touchscreen display, a keyboard, a keypad, a mouse, a button, a switch, a microphone, a camera, etc.).

Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

Memory 206 and/or storage component 208 may include data storage or one or more data structures (e.g., a database and/or the like). Device 200 may be capable of receiving information from, storing information in, communicating information to, or searching information stored in the data storage or one or more data structures in memory 206 and/or storage component 208. For example, the information may include input data, output data, transaction data, account data, or any combination thereof.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Referring now to FIG. 3A, FIG. 3A is a flowchart of a non-limiting embodiment of a process 300A for generating a shared secret for secure chat messaging. In some non-limiting embodiments, one or more of the functions described with respect to process 300A may be performed (e.g., completely, partially, etc.) by secure message system 102. In some non-limiting embodiments, one or more of the steps of process 300A may be performed (e.g., completely, partially, and/or the like) by another device or a group of devices separate from or including secure message system 102, such as user devices 104.

As shown in FIG. 3A, at step 302, process 300A may include receiving an API request. In some non-limiting embodiments, secure message system 102 may receive an API request for a shared chat secret. In some non-limiting embodiments, the API request may include a user encryption key of a keypair.

In some non-limiting embodiments, secure message system 102 may generate a public/private encryption keypair for a shared chat secret. In some non-limiting embodiments, the shared chat secret may include the public key of the public/private encryption keypair. In some non-limiting embodiments, user device 104 may generate an ephemeral keypair using a public key algorithm, such as Rivest-Shamir-Adleman (RSA), and/or the like. The ephemeral keypair may include an ephemeral public key and an ephemeral private key. In some non-limiting embodiments, an ephemeral keypair may include a keypair that is designed for a one-time use and once the keypair is used, it is destroyed by secure message system 102.

In some non-limiting embodiments, the user encryption key of the keypair may include a public key of a public/private encryption keypair. In some non-limiting embodiments, secure message system 102 may generate the public/private encryption keypair for the shared secret. In some non-limiting embodiments, secure message system 102 may generate the API request for the shared secret. The API request may include the public key of the public/private encryption keypair. In some non-limiting embodiments, secure message system 102 may transmit the API request for the shared secret.

In some non-limiting embodiments, secure message system 102 may retrieve the encrypted chat secret based on a chat identifier included in the API request.

As shown in FIG. 3A, at step 304, process 300A may include determining user authorization. In some non-limiting embodiments, secure message system 102 may determine whether a user is authorized for a chat messaging application based on the API request. In some non-limiting embodiments, determining whether the user is authorized for the chat messaging application may include checking access permissions of the user based on a token included in the API request. In some non-limiting embodiments, secure message system 102 may transmit a request for an encrypted chat secret based on the API request.

As shown in FIG. 3A, at step 306, process 300A may include receiving an encrypted chat secret. In some non-limiting embodiments, secure message system 102 may receiving the encrypted chat secret. In some non-limiting embodiments, secure message system 102 may transmit the encrypted chat secret to KMS 108. In some non-limiting embodiments, KMS 108 may include a hardened KMS such that no encryption keys are exported from KMS 108. In some non-limiting embodiments, secure message system 102 may determine whether the encrypted chat secret is authorized. Secure message system 102 may decrypt the encrypted chat secret based on determining that the encrypted chat secret is authorized.

As shown in FIG. 3A, at step 308, process 300A may include receiving a chat secret. In some non-limiting embodiments, secure message system 102 may receive a chat secret from KMS 108. In some non-limiting embodiments, the chat secret may include a chat secret that has been generated by decrypting the encrypted chat secret.

As shown in FIG. 3A, at step 310, process 300A may include wrapping a chat secret. In some non-limiting embodiments, secure message system 102 may wrap the chat secret according to an encryption algorithm using the user encryption key to provide a wrapped chat secret. In some non-limiting embodiments, secure message system 102 may receive the wrapped chat secret. Secure message system 102 may decrypt the wrapped chat secret to provide the chat secret.

In some non-limiting embodiments, the user encryption key of the keypair may include a public key of a public/private encryption keypair. In some non-limiting embodiments, the private key of the public/private encryption keypair may include a key that is kept internal to user device 104 and/or the chat messaging application executing on user device 104 and is not shared with other devices or systems outside of the chat messaging application.

In some non-limiting embodiments, secure message system 102 may decrypt the wrapped chat secret to provide the chat secret by decrypting the wrapped chat secret to provide the chat secret using a private key of the public/private encryption keypair. In some non-limiting embodiments, secure message system 102 may destroy the keypair following an event associated with a chat session.

As shown in FIG. 3A, at step 312, process 300A may include generating an access token. In some non-limiting embodiments, secure message system 102 may generate an access token based on a session identifier. In some non-limiting embodiments, secure message system 102 may transmit the access token to KMS 108. In some non-limiting embodiments, secure message system 102 may receive a signed access token from KMS 108. In some non-limiting embodiments, secure message system 102 may transmit the wrapped chat secret and the signed access token.

In some non-limiting embodiments, secure message system 102 may transmit the access token to KMS 108. KMS 108 may receive the access token from secure message system 102. In some non-limiting embodiments, KMS 108 may authorize and sign the access token. In some non-limiting embodiments, KMS 108 may generate a signed access token by signing the access token based on whether secure message system 102 issued (e.g., generated) the access token. In some non-limiting embodiments, KMS 108 may verify whether secure message system 102 issued the access token by signing the access token (e.g., generating the signed access token). KMS 108 may return the signed access token to secure message system 102 in response to receiving the access token and signing the access token by transmitting the signed access token to secure message system 102. In some non-limiting embodiments, user device 104 may be unable to communicate with secure message system 102 (e.g., the message API of secure message system 102) unless user device 104 receives the signed access token from KMS 108 and/or secure message system 102. For example, if user device 104 acquires the signed access token from KMS 108, user device 104 may successfully make requests to the message API of secure message system 102.

In some non-limiting embodiments, secure message system 102 may transmit the wrapped chat secret and the signed access token. In some non-limiting embodiments, secure message system 102 may transmit the wrapped chat secret and the signed access token to user device 104. User device 104 may receive the wrapped chat secret and the signed access token from secure message system 102. In some non-limiting embodiments, secure message system 102 may return the wrapped chat secret and the signed access token to user device 104 in response to receiving the API request from user device 104.

In some non-limiting embodiments, user device 104 may unwrap the wrapped chat secret according to an encryption algorithm to provide a shared chat secret. In some non-limiting embodiments, secure message system 102 may unwrap the wrapped chat secret. In some non-limiting embodiments, secure message system 102 and/or user device 104 may unwrap the wrapped chat secret according to an encryption algorithm, such as RSA-based Key-Encapsulation Mechanism with a Key-Wrapping Scheme (RSA-KEM-KWS), and/or the like.

Referring now to FIG. 3B, FIG. 3B is a diagram of a non-limiting embodiment of an implementation of a process (e.g., process 300A) for generating a shared secret for secure chat messaging. As shown in FIG. 3B, implementation 300B may include secure message system 102, user device 104, database device 106, and KMS 108. Implementation 300B may include steps of a process (e.g., process 300A) being carried out using one or more systems and/or devices.

As shown in FIG. 3B, at step 301, user device 104 may generate a public/private encryption keypair for a shared chat secret. In some non-limiting embodiments, the shared chat secret may include the public key of the public/private encryption keypair. In some non-limiting embodiments, user device 104 may generate an ephemeral keypair using a public key algorithm, such as Rivest-Shamir-Adleman (RSA), and/or the like. The ephemeral keypair may include an ephemeral public key and an ephemeral private key. In some non-limiting embodiments, an ephemeral keypair may include a keypair that is designed for a one-time use and once the keypair is used, it is destroyed by secure message system 102.

As shown in FIG. 3B, at step 303, user device 104 may generate an API request for a shared chat secret. In some non-limiting embodiments, user device 104 may transmit the API request for the shared chat secret to secure message system 102. Secure message system 102 may receive the API request for the shared chat secret from user device 104. In some non-limiting embodiments, the API request may include a user encryption key of a keypair. The user encryption key of the keypair may include an ephemeral public key. In some non-limiting embodiments, the API request may include a JSON web token (JWT) in a header of the API request. The API request may include a chat parameter (e.g., chat identifier) and the user encryption key in a body of the API request.

In some non-limiting embodiments, the JWT may include the session identifier that is used to fetch the session from secure message system 102 that contains a unique refresh code. In some non-limiting embodiments, secure message system 102 may generate the access token based on a session identifier, and the access token may include the unique refresh code. The access token ensures user device 104 is authorized to communicate with secure message system 102 (e.g., the message API of secure message system 102).

As shown in FIG. 3B, at step 305, secure message system 102 may determine user authorization. In some non-limiting embodiments, secure message system 102 may determine whether a user is authorized for a chat messaging application based on the API request received by secure message system 102. Secure message system 102 may determine whether the user is authorized for the chat messaging application by checking access permissions of the user based on a token included in the API request. In some non-limiting embodiments, secure message system 102 may determine whether the user is authorized based on the JWT in the header of the API request.

As shown in FIG. 3B, at step 307, secure message system 102 may generate a request for an encrypted chat secret based on the API request. Secure message system 102 may transmit the request for the encrypted chat secret to database device 106. In some non-limiting embodiments, the request for the encrypted chat secret may include the chat parameter in the body of the API request. Database device 106 may receive the request for the encrypted chat secret from secure message system 102. Database device 106 may return the encrypted chat secret to secure message system 102 in response to receiving the request for the encrypted chat secret by transmitting the encrypted chat secret to secure message system 102. Secure message system 102 may receive the encrypted chat secret from database device 106. In some non-limiting embodiments, the encrypted chat secret may be based on the chat parameter.

As shown in FIG. 3B, at step 309, secure message system 102 may transmit the encrypted chat secret to KMS 108. In some non-limiting embodiments, KMS 108 may be a hardened KMS such that no encryption keys are exported from KMS 108. KMS 108 may receive the encrypted chat secret from secure message system 102. In some non-limiting embodiments, KMS 108 may determine whether the encrypted chat secret is authorized. KMS 108 may decrypt the encrypted chat secret based on determining that the encrypted chat secret is authorized. In some non-limiting embodiments, KMS 108 may generate a chat secret by decrypting the encrypted chat secret. KMS 108 may return the chat secret to secure message system 102 in response to receiving the encrypted chat secret and decrypting the encrypted chat secret by transmitting the chat secret to secure message system 102.

As shown in FIG. 3B, at step 311, secure message system 102 may wrap the chat secret received from KMS 108. Secure message system 102 may wrap the chat secret according to an encryption algorithm using the user encryption key to provide a wrapped chat secret. In some non-limiting embodiments, secure message system 102 may wrap the chat secret according to an encryption algorithm, such as RSA-KEM-KWS, and/or the like.

As shown in FIG. 3B, at step 313, secure message system 102 may generate an access token based on a session identifier. In some non-limiting embodiments, the access token may be used to access a message API of secure message system 102. In some non-limiting embodiments, the access token may be cryptographically verifiable and may include a time-limited authorization token.

As shown in FIG. 3B, at step 315, secure message system 102 may transmit the access token to KMS 108. KMS 108 may receive the access token from secure message system 102. In some non-limiting embodiments, KMS 108 may authorize and sign the access token. In some non-limiting embodiments, KMS 108 may generate a signed access token by signing the access token. In some non-limiting embodiments, KMS 108 may verify whether secure message system 102 issued the access token by signing the access token (e.g., generating the signed access token). KMS 108 may return the signed access token to secure message system 102 in response to receiving the access token and signing the access token by transmitting the signed access token to secure message system 102. In some non-limiting embodiments, user device 104 may be unable to communicate with secure message system 102 (e.g., the message API of secure message system 102) unless user device 104 receives the signed access token from KMS 108 and/or secure message system 102. For example, if user device 104 acquires the signed access token from KMS 108, user device 104 may successfully make requests to the message API of secure message system 102.

As shown in FIG. 3B, at step 317, secure message system 102 may transmit the wrapped chat secret and the signed access token. In some non-limiting embodiments, secure message system 102 may transmit the wrapped chat secret and the signed access token to user device 104. User device 104 may receive the wrapped chat secret and the signed access token from secure message system 102. Secure message system 102 may return the wrapped chat secret and the signed access token to user device 104 in response to receiving the API request from user device 104.

As shown in FIG. 3B, at step 319, user device 104 may unwrap the wrapped chat secret according to an encryption algorithm to provide a shared chat secret. In some non-limiting embodiments or aspects, secure message system 102 may unwrap the wrapped chat secret. In some non-limiting embodiments, secure message system 102 and/or user device 104 may unwrap the wrapped chat secret according to an encryption algorithm, such as RSA-KEM-KWS, and/or the like.

Figure 4A:
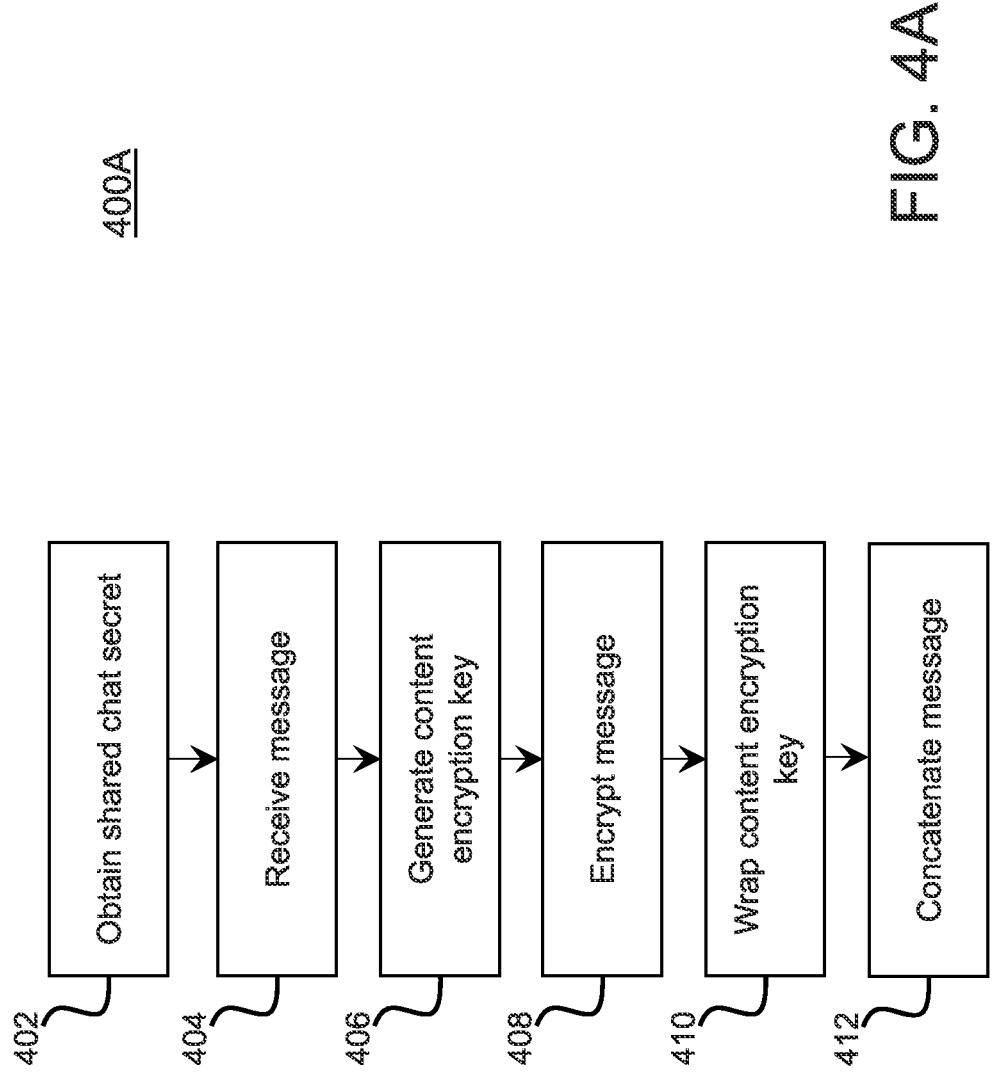
FIG. 4A is a flowchart of a non-limiting embodiment or aspect of a process for encrypting a message for secure chat messaging.

Referring now to FIG. 4A, FIG. 4A is a flowchart of a non-limiting embodiment or aspect of a process 400A for encrypting a message for secure chat messaging. In some non-limiting embodiments, one or more of the functions described with respect to process 400A may be performed (e.g., completely, partially, etc.) by secure message system 102. In some non-limiting embodiments, one or more of the steps of process 400A may be performed (e.g., completely, partially, and/or the like) by another device or a group of devices separate from or including secure message system 102, such as user devices 104.

As shown in FIG. 4A, at step 402, process 400A may include obtaining a shared chat secret. In some non-limiting embodiments, secure message system 102 may obtain a shared chat secret.

As shown in FIG. 4A, at step 404, process 400A may include receiving a message. In some non-limiting embodiments, secure message system 102 may receive a plaintext message.

As shown in FIG. 4A, at step 406, process 400A may include generating a content encryption key. In some non-limiting embodiments, secure message system 102 may generate a content encryption key for the shared chat secret. In some non-limiting embodiments, the content encryption key may be random and/or generated randomly. In some non-limiting embodiments, the content encryption key may include a content encryption key having high entropy (e.g., the content encryption key is very hard to predict). In some non-limiting embodiments, user device 104-1 may generate the content encryption key according to Federal Information Processing Standards (FIPS) Publication 197, Advanced Encryption Standard (AES).

In some non-limiting embodiments, a plurality of user devices 104 may each execute a separate instance of the chat messaging application. In some non-limiting embodiments, each separate instance of the chat messaging application (e.g., each instance running on a separate user device) may generate content encryption keys that are random differently from other separate instances of the chat messaging application. For example, user device 104-1 executing instance A of the chat messaging application may generate a random content encryption key differently than user device 104-2 executing instance B of the chat messaging application may generate a random content encryption key. That is, the output of the algorithms that generate the content encryption keys will be different for each instance of the chat messaging application. In this way, an adversary (e.g., hacker) of the chat messaging application could not compromise a single user device and guess how the chat messaging application (e.g. user device 104 and/or secure message system 102) generates the random content encryption keys to then use the information gathered from the generation of the random content encryption keys to then guess the keys for the encrypted message from there. The keys for the encrypted message could not be guessed because each separate instance of the chat messaging application (e.g., user device 104) would produce a different output.

As shown in FIG. 4A, at step 408, process 400A may include encrypting a message. In some non-limiting embodiments, secure message system 102 may encrypt the plaintext message according to a first encryption algorithm using the content encryption key to provide an encrypted message. In some non-limiting embodiments, an encrypted message may include encrypted text (e.g., ciphertext). In some non-limiting embodiments, secure message system 102 may use the content encryption key to encrypt the plaintext message using an authenticated encryption mode (e.g., Galois/Counter Mode (GCM), counter with cipher block chaining message authentication code mode (CCM), Elastical Accessible Extension (e.g., encrypt-then-authenticate-then-translate) mode (EAX), and/or the like). In some non-limiting embodiments, encrypting the plaintext message using EAX mode may protect the integrity of the plaintext message by performing a keyed hash on the plaintext message to provide the encrypted message, such that if the encrypted message were tampered with in any way, the presence of tampering may be detected when the encrypted message is decrypted.

As shown in FIG. 4A, at step 410, process 400A may include wrapping a content encryption key. In some non-limiting embodiments, secure message system 102 may wrap the content encryption key according to a second encryption algorithm with the shared chat secret to provide a wrapped content encryption key. In some non-limiting embodiments, secure message system 102 and/or user device 104 may wrap the content encryption key according to a symmetric algorithm (e.g., the AES Key Wrap (KW) algorithm, and/or the like). In some non-limiting embodiments, user device 104-1 may wrap the content encryption key according to an asymmetric algorithm (e.g., RSA-Optimal Asymmetric Encryption Padding (RSA-OAEP), RSA-based Key-Encapsulation Mechanism (RSA-KEM), and/or the like).

In some non-limiting embodiments, wrapping may refer to the act of encrypting a second encryption key using a first encryption key (e.g., encapsulating cryptographic key material, a key encapsulation algorithm, encrypting an encryption key). Key wrapping may be intended for applications, such as protecting cryptographic keys while the cryptographic keys are in untrusted storage and/or protecting cryptographic keys while the cryptographic keys are transmitted over untrusted communication networks.

As shown in FIG. 4A, at step 412, process 400A may include concatenating a message. In some non-limiting embodiments, secure message system 102 may concatenate the wrapped content encryption key and the encrypted message to provide a concatenated message. In some non-limiting embodiments, secure message system 102 may transmit an API request that includes the concatenated message.

In some non-limiting embodiments, secure message system 102 may receive the API request. Secure message system 102 may store the concatenated message based on a chat identifier of the concatenated message and a timestamp associated with the concatenated message. In some non-limiting embodiments, secure message system 102 may transmit a push notification associated with the concatenated message. The push notification may include a unique identifier associated with the chat identifier of the concatenated message.

In some non-limiting embodiments, secure message system 102 may determine whether a user is authorized for a chat messaging application based on an access token included in the API request. Secure message system 102 may determine whether the user is authorized for the chat messaging application by transmitting an authorization request to KMS 108. In some non-limiting embodiments, the authorization request may include the access token included in the API request.

In some non-limiting embodiments, secure message system 102 may verify a signature of the access token included in the authorization request. Secure message system 102 may transmit an authorization confirmation response based on verifying the signature of the access token. In some non-limiting embodiments, secure message system 102 may authorize activity for a chat session based on a chat identifier. Secure message system 102 may authorize activity for the chat session by reading a token claim of the access token and determining that the activity for the chat session is authorized based on the chat identifier and the key value pair. In some non-limiting embodiments, the token claim may include a key value pair.

In some non-limiting embodiments, a token claim may refer to the key value pair contained in a JWT. A JWT may contain a header and a body (e.g., payload), where the body contains the token claim. The token claim may include a statement about an entity (e.g., a user) and additional data. Token claims may be either registered, public, or private token claims. In some non-limiting embodiments, token claims may be defined by the developer of the application using the JWT.

In some non-limiting embodiments, secure message system 102 may generate an API request that includes the concatenated message. In some non-limiting embodiments, the body of the API request may include the concatenated message. In some non-limiting embodiments, the header of the API request may include the access token. In some non-limiting embodiments, secure message system 102 may transmit and/or receive the API request that includes the concatenated message.

In some non-limiting embodiments, secure message system 102 may determine whether a user is authorized for a chat messaging application based on the access token included in the API request. In some non-limiting embodiments, secure message system 102 may determine whether the user is authorized by transmitting an authorization request to KMS 108. In some non-limiting embodiments, secure message system 102 may generate the authorization request. The authorization request may include the access token included in the API request. In some non-limiting embodiments, KMS 108 may receive the authorization request from secure message system 102. In some non-limiting embodiments, KMS 108 may determine whether a user is authorized by processing the access token (e.g., verifying a signature of the access token). KMS 108 may verify a signature of the access token included in the authorization request. KMS 108 may return the result of authorization (e.g., verification of the signature of the access token) to secure message system 102 by transmitting an authorization confirmation response based on verifying the signature of the access token.

In some non-limiting embodiments, secure message system 102 may authorize activity for a chat session. Secure message system 102 may authorize activity for a chat session based on a chat identifier. In some non-limiting embodiments, secure message system 102 may authorize activity for a chat session by reading a token claim of the access token included in the API request that includes a key value pair. Secure message system 102 may determine that the activity for the chat session is authorized based on the chat identifier and the key value pair.

In some non-limiting embodiments, secure message system 102 may persist the concatenated message in database device 106. In some non-limiting embodiments, secure message system 102 may transmit the concatenated message and the chat identifier to database device 106 for storage (e.g., persistent storage). In some non-limiting embodiments, database device 106 may receive the concatenated message, the chat identifier, and a timestamp associated with the concatenated message. Database device 106 may store the concatenated message based on the chat identifier of the concatenated message and a timestamp associated with the concatenated message. In some non-limiting embodiments, database device 106 may return a response (e.g., a confirmation response, and/or the like) to secure message system 102 indicating that the concatenated message was successfully stored (e.g., that the write operation to the database was successful). In some non-limiting embodiments, the concatenated message may be stored as a write operation to database device 106, such that a copy of the concatenated message is stored in database device 106 while the original concatenated message may still reside with secure message system 102.

In some non-limiting embodiments, secure message system 102 may generate a push notification associated with the concatenated message. Secure message system 102 may transmit the push notification associated with the concatenated message to a notification service (e.g., a notification API associated with secure message system 102). The push notification may include a unique identifier associated with the chat identifier of the concatenated message. In some non-limiting embodiments, secure message system 102 may transmit a confirmation message that the push notification was sent successfully to user devices 104.

Referring now to FIG. 4B, FIG. 4B is a diagram of a non-limiting embodiment of an implementation of a process (e.g., process 400A) for encrypting a message for secure chat messaging. As shown in FIG. 4B, implementation 400B may include secure message system 102, user devices 104, database device 106, and KMS 108. Implementation 400B may include steps of a process (e.g., process 400A) being carried out using one or more systems and/or devices.

As shown in FIG. 4B, at step 401, user device 104-1 may obtain a shared chat secret. In some non-limiting embodiments, the shared chat secret may include the public key of the public/private encryption keypair. In some non-limiting embodiments, user device 104-1 may obtain an access token associated with the shared chat secret. In some non-limiting embodiments, the access token may be used to access a message API of secure message system 102. The access token may be cryptographically verifiable and may include a time-limited authorization token. For example, user device 104-1 may only be granted a small duration of time to send requests to the message API using the access token.

As shown in FIG. 4B, at step 403, user device 104-1 may receive a plaintext message. In some non-limiting embodiments, user device 104-1 may receive the plaintext message from input component 210 of user device 104-1 as input from a user. In some non-limiting embodiments, a plaintext message may include a message that is unencrypted and/or a message that can be viewed without requiring a key or other decryption mechanism. A plaintext message may include a message in the form of American Standard Code for Information Interchange (ASCII) characters, binary code, and/or other forms of data in a format that is not encrypted.

As shown in FIG. 4B, at step 405, user device 104-1 may generate a content encryption key. In some non-limiting embodiments, user device 104-1 may generate the content encryption key randomly. The content encryption key may include a content encryption key having high entropy (e.g., the content encryption key is very hard to predict). In some non-limiting embodiments, user device 104-1 may use the content encryption key to encrypt the plaintext message using an authenticated encryption mode (e.g., GCM, CCM, EAX, and/or the like). In some non-limiting embodiments, user device 104-1 may wrap the content encryption key using the shared chat secret.

As shown in FIG. 4B, at step 407, user device 104-1 may encrypt the plaintext message. User device 104-1 may encrypt the plaintext message according to an encryption algorithm using the content encryption key to provide an encrypted message. In some non-limiting embodiments, user device 104-1 may encrypt the plaintext message according to AES. In some non-limiting embodiments, user device 104-1 may encrypt the plaintext message according to an authenticated encryption mode (e.g., GCM, CCM, EAX, and/or the like).

As shown in FIG. 4B, at step 409, user device 104-1 may wrap the content encryption key. User device 104-1 may wrap the content encryption key according to an encryption algorithm with the shard chat secret to provide a wrapped content encryption key. In some non-limiting embodiments, user device 104-1 may wrap the content encryption key according to a symmetric algorithm (e.g., the AES KW algorithm, and/or the like). In some non-limiting embodiments, user device 104-1 may wrap the content encryption key according to an asymmetric algorithm (e.g., RSA-OAEP, RSA-KEM, and/or the like).

As shown in FIG. 4B, at step 411, user device 104-1 may concatenate the wrapped content encryption key and the encrypted message to provide a concatenated message. In some non-limiting embodiments, the wrapped content encryption key may have a constant (e.g., predictable, known, etc.) length to allow user devices 104 and/or secure message system 102 to parse the concatenated message.

As shown in FIG. 4B, at step 413, user device 104-1 may generate an API request that includes the concatenated message. In some non-limiting embodiments, user device 104-1 may include the concatenated message in the body of the API request. In some non-limiting embodiments, user device 104-1 may include the access token in the header of the API request. User device 104-1 may transmit the API request that includes the concatenated message to secure message system 102. The steps shown in FIG. 4B performed by secure message system 102 may be performed by secure message system 102 and/or a message API (e.g., a message API server) which is included in secure message system 102 or separate from secure message system 102. In some non-limiting embodiments, user device 104-1 may transmit the API request that includes the concatenated message to the message API of secure message system 102. Secure message system 102 may receive the API request that includes the concatenated message.

As shown in FIG. 4B, at step 415, secure message system 102 may determine whether a user is authorized for a chat messaging application based on the access token included in the API request. In some non-limiting embodiments, secure message system 102 may determine whether the user is authorized by transmitting an authorization request to KMS 108. In some non-limiting embodiments, secure message system 102 may generate the authorization request. The authorization request may include the access token included in the API request. In some non-limiting embodiments, KMS 108 may receive the authorization request from secure message system 102. In some non-limiting embodiments, KMS 108 may determine whether a user is authorized by processing the access token (e.g., verifying a signature of the access token). KMS 108 may verify a signature of the access token included in the authorization request. KMS 108 may return the result of authorization (e.g., verification of the signature of the access token) to secure message system 102 by transmitting an authorization confirmation response based on verifying the signature of the access token.

As shown in FIG. 4B, at step 417, secure message system 102 may authorize activity for a chat session. Secure message system 102 may authorize activity for a chat session based on a chat identifier. In some non-limiting embodiments, secure message system 102 may authorize activity for a chat session by reading a token claim of the access token included in the API request that includes a key value pair. Secure message system 102 may determine that the activity for the chat session is authorized based on the chat identifier and the key value pair.

As shown in FIG. 4B, at step 419, secure message system 102 may persist the concatenated message in database device 106. In some non-limiting embodiments, secure message system 102 may transmit the concatenated message and the chat identifier to database device 106 for storage (e.g., persistent storage). In some non-limiting embodiments, database device 106 may receive the concatenated message, the chat identifier, and a timestamp associated with the concatenated message. Database device 106 may store the concatenated message based on the chat identifier of the concatenated message and a timestamp associated with the concatenated message. For example, database device 106 may store the concatenated message in an index corresponding to the chat identifier (e.g., the chat identifier may act as a primary key in the database) and database device 106 may store one or more concatenated messages in the index corresponding to the chat identifier as collated (e.g., ordered) messages, ordered by the timestamps associated with the one or more concatenated messages. In some non-limiting embodiments, the one or more concatenated messages may be ordered by the timestamps beginning with the most recent message received. In some non-limiting embodiments, database device 106 may return a response (e.g., a confirmation response, and/or the like) to secure message system 102 indicating that the concatenated message was successfully stored (e.g., that the write operation to the database was successful). In some non-limiting embodiments, the concatenated message is stored as a write operation to database device 106, such that a copy of the concatenated message is stored in database device 106 while the original may still reside with secure message system 102.

As shown in FIG. 4B, at step 421, secure message system 102 may generate a push notification associated with the concatenated message. Secure message system 102 may transmit the push notification associated with the concatenated message to a notification service (e.g., a notification API associated with secure message system 102). The push notification may include a unique identifier associated with the chat identifier of the concatenated message. In this way, the push notification protects the confidentiality of the concatenated message, because the actual concatenated message is not shared via the push notification, but only the unique identifier associated with the chat identifier of the concatenated message. This allows for receivers of the push notification (e.g., other users) to be notified that a new message is available without revealing the contents of the message. In some non-limiting embodiments, user device 104-1 may receive a confirmation message that the push notification was sent successfully.

The steps shown in FIG. 4B performed by secure message system 102 may be performed by secure message system 102 and/or a notification API (e.g., a notification API server) which is included in secure message system 102 or separate from secure message system 102. In some non-limiting embodiments, the notification service that receives the push notification may forward the push notification to a separate user device, such as user device 104-2. In some non-limiting embodiments, user devices 104 may receive the push notification to access the contents of the concatenated message. In some non-limiting embodiments, user devices 104 may access the contents of the concatenated message by querying the unique identifier and performing authorization and message decryption as described herein (e.g., process 500A and implementation 500B).

As shown in FIG. 4B, at step 423, secure message system 102 may transmit the push notification associated with the concatenated message. Secure message system 102 may transmit the push notification (e.g., from the notification service included in secure message system 102) to user device 104-2. The push notification may include a unique identifier associated with the chat identifier of the concatenated message. In some non-limiting embodiments, user device 104-2 may receive the push notification from secure message system 102. In some non-limiting embodiments, any of user device 104 may receive the push notification from secure message system 102.

Referring now to FIG. 5A, FIG. 5A is a flowchart of a non-limiting embodiment of a process 500A for decrypting a message for secure chat messaging. In some non-limiting embodiments, one or more of the functions described with respect to process 500A may be performed (e.g., completely, partially, etc.) by secure message system 102. In some non-limiting embodiments, one or more of the steps of process 500A may be performed (e.g., completely, partially, and/or the like) by another device or a group of devices separate from or including secure message system 102, such as user devices 104.

As shown in FIG. 5A, at step 502, process 500A may include obtaining a shared chat secret. In some non-limiting embodiments, secure message system 102 may obtain a shared chat secret.

As shown in FIG. 5A, at step 504, process 500A may include receiving a message notification. In some non-limiting embodiments, secure message system 102 may receive a message notification associated with an encrypted message. In some non-limiting embodiments, secure message system 102 may receive the message notification associated with the encrypted message from a notification API server. In some non-limiting embodiments, the message notification may include a unique identifier associated with the encrypted message. In some non-limiting embodiments, secure message system 102 may transmit a message request. In some non-limiting embodiments, the message request may include the unique identifier associated with the encrypted message.

In some non-limiting embodiments, secure message system 102 may verify a signature of an access token included in the message request. In some non-limiting embodiments, secure message system 102 may transmit an authorization confirmation response based on verifying the signature of the access token. In some non-limiting embodiments, secure message system 102 may authorize activity for a chat session based on the unique identifier associated with the encrypted message. In some non-limiting embodiments, secure message system 102 may authorize the activity for the chat session by authorizing, with a messaging API server, the activity for the chat session. Secure message system 102 may authorize activity for the chat session by reading a token claim of an access token included in the message request and determining that the activity for the chat session is authorized based on the unique identifier and the key value pair. In some non-limiting embodiments, the token claim may include a key value pair.

In some non-limiting embodiments, the token claim may include a retention value for the encrypted message (e.g., a time to live). In some non-limiting embodiments, the retention value may represent an amount of time (e.g., days, months, years, etc.) to keep the encrypted message. For example, secure message system 102 may read the token claim to determine a retention value of the encrypted message. The retention value may be 2 days, meaning that the message is valid for 2 days and should be kept for 2 days. After the amount of time corresponding to the retention value has elapsed, secure message system 102 may destroy the encrypted message. In some non-limiting embodiments, the retention value may be determined by secure message system 102 when secure message system 102 generates the access token. In some non-limiting embodiments, when secure message system 102 reads the token claim and the retention value has elapsed, secure message system 102 may receive a response indicating that the encrypted message no longer exists.

As shown in FIG. 5A, at step 506, process 500A may include receiving a concatenated message. In some non-limiting embodiments, secure message system 102 may receive a concatenated message based on the message request. In some non-limiting embodiments, secure message system 102 may retrieve the concatenated message from a database based on a chat identifier of the concatenated message, the unique identifier associated with the encrypted message, or any combination thereof.

As shown in FIG. 5A, at step 508, process 500A may include parsing a concatenated message. In some non-limiting embodiments, secure message system 102 may parse the concatenated message to provide an encrypted message and a wrapped content encryption key.

As shown in FIG. 5A, at step 510, process 500A may include unwrapping a content encryption key. In some non-limiting embodiments, secure message system 102 may unwrap the wrapped content encryption key according to a first encryption algorithm with the shared chat secret to provide an uwrapped content encryption key.

As shown in FIG. 5A, at step 512, process 500A may include decrypting a message. In some non-limiting embodiments, secure message system 102 may decrypt the encrypted message according to a second encryption algorithm using the unwrapped content encryption key to provide a plaintext message. In some non-limiting embodiments, secure message system 102 may process the plaintext message.

Figure 5B:
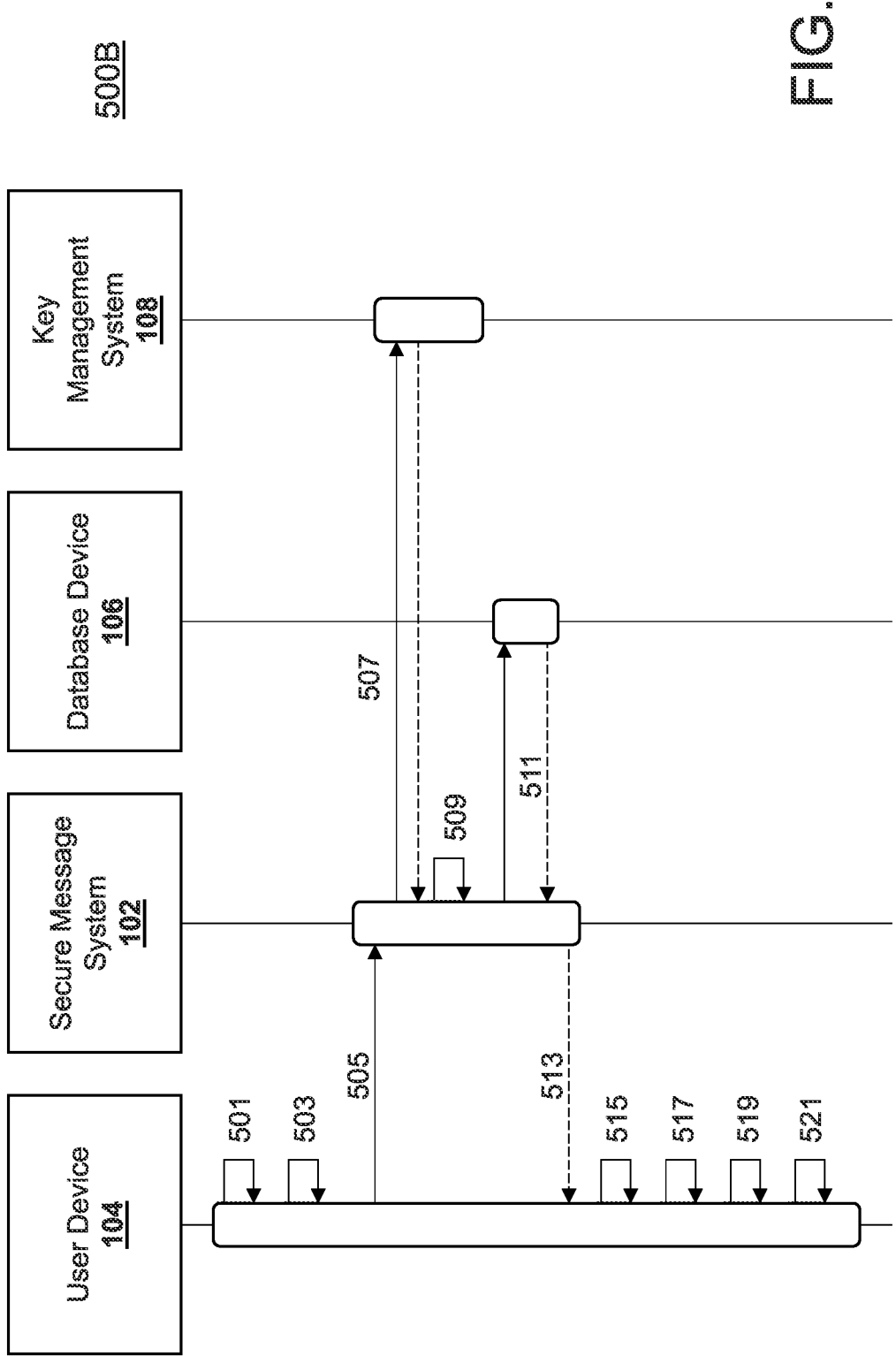
FIG. 5B is a diagram of a non-limiting embodiment of an implementation of a process for decrypting a message for secure chat messaging.

Referring now to FIG. 5B, FIG. 5B is a diagram of a non-limiting embodiment of an implementation of a process (e.g., process 500A) for decrypting a message for secure chat messaging. As shown in FIG. 5B, implementation 500B may include secure message system 102, user device 104, database device 106, and KMS 108. Implementation 500B may include steps of a process (e.g., process 500A) being carried out using one or more systems and/or devices.

As shown in FIG. 5B, at step 501, user device 104 may obtain a shared chat secret. In some non-limiting embodiments, the shared chat secret may include the public key of the public/private encryption keypair. In some non-limiting embodiments, user device 104 may obtain an access token associated with the shared chat secret. In some non-limiting embodiments, the access token may be used to access a message API of secure message system 102. The access token may be cryptographically verifiable and may include a time-limited authorization token. For example, user device 104 may only be granted a small duration of time to send requests to the message API using the access token.

As shown in FIG. 5B, at step 503, user device 104 may receive a message notification (e.g., a push notification). In some non-limiting embodiments, the message notification may be associated with an encrypted message (e.g., a concatenated message) and may include a unique identifier associated with the encrypted message. User device 104 may receive the message notification from secure message system 102 (e.g., a notification API).

As shown in FIG. 5B, at step 505, user device 104 may generate a message request that includes the unique identifier associated with the encrypted message. In some non-limiting embodiments, user device 104 may include the unique identifier associated with the encrypted message in the body of the message request. In some non-limiting embodiments, user device 104 may include the access token in the header of the message request. User device 104 may transmit the message request that includes the unique identifier associated with the encrypted message to secure message system 102. The steps shown in FIG. 5B performed by secure message system 102 may be performed by secure message system 102 and/or a message API (e.g., a message API server) which is included in secure message system 102 or separate from secure message system 102. In some non-limiting embodiments, user device 104 may transmit the message request that includes the unique identifier associated with the encrypted message to the message API of secure message system 102. Secure message system 102 may receive the message request that includes the unique identifier associated with the encrypted message.

As shown in FIG. 5B, at step 507, secure message system 102 may determine whether a user is authorized for a chat messaging application based on the access token included in the message request. In some non-limiting embodiments, secure message system 102 may determine whether the user is authorized by transmitting an authorization request to KMS 108. In some non-limiting embodiments, secure message system 102 may generate the authorization request. The authorization request may include the access token included in the message request. In some non-limiting embodiments, KMS 108 may receive the authorization request from secure message system 102. In some non-limiting embodiments, KMS 108 may determine whether a user is authorized by processing the access token (e.g., verifying a signature of the access token). KMS 108 may verify a signature of the access token included in the authorization request. KMS 108 may return the result of authorization (e.g., verification of the signature of the access token) to secure message system 102 by transmitting an authorization confirmation response based on verifying the signature of the access token.

As shown in FIG. 5B, at step 509, secure message system 102 may authorize activity for a chat session. Secure message system 102 may authorize activity for a chat session based on the unique identifier associated with the encrypted message. In some non-limiting embodiments, secure message system 102 may authorize activity for a chat session by reading a token claim of the access token included in the message request that includes a key value pair. Secure message system 102 may determine that the activity for the chat session is authorized based on the unique identifier and the key value pair.

As shown in FIG. 5B, at step 511, secure message system 102 may retrieve (e.g., fetch, query) a concatenated message from database device 106. In some non-limiting embodiments, secure message system 102 may retrieve the concatenated message based on the unique identifier associated with the encrypted message corresponding to a chat identifier associated with the concatenated message stored in database device 106. In some non-limiting embodiments, database device 106 may receive a query operation from secure message system 102 requesting the concatenated message. For example, database device 106 may receive a query operation requesting the concatenated message and the chat identifier associated with the concatenated message. The query operation may contain the unique identifier associated with the encrypted message. Database device 106 may match the unique identifier with the chat identifier and database device 106 may return the concatenated message associated with the chat identifier to secure message system 102.

As shown in FIG. 5B, at step 513, secure message system 102 may return a concatenated message based on the message request transmitted by user device 104 at step 505. User device 104 may receive the concatenated message from secure message system 102. The concatenated message received by user device 104 may be encrypted and/or wrapped and may require decryption by user device 104 and/or the chat messaging application.

As shown in FIG. 5B, at step 515, user device 104 may parse the concatenated message to provide an encrypted message and a wrapped content encryption key.

As shown in FIG. 5B, at step 517, user device 104 may unwrap the wrapped content encryption key. User device 104 may unwrap the wrapped content encryption key according to an encryption algorithm with the shared chat secret to provide an unwrapped content encryption key. In some non-limiting embodiments, user device 104 may unwrap the wrapped content encryption key according to a symmetric algorithm (e.g., the AES KW algorithm, and/or the like). In some non-limiting embodiments, user device 104 may unwrap the wrapped content encryption key according to an asymmetric algorithm (e.g., RSA-OAEP, RSA-KEM, and/or the like).

As shown in FIG. 5B, at step 519, user device 104 may decrypt the encrypted message. User device 104 may decrypt the encrypted message according to an encryption algorithm using the unwrapped content encryption key to provide a plaintext message. In some non-limiting embodiments, user device 104 may decrypt the encrypted message according to AES. In some non-limiting embodiments, user device 104 may decrypt the encrypted message according to an authenticated decryption mode (e.g., GCM, CCM, EAX, and/or the like).

As shown in FIG. 5B, at step 521, user device 104 may process the plaintext message. For example, user device 104 may cause the plaintext message to be displayed via output component 212.

In some non-limiting embodiments, the processes shown and described with regard to FIGS. 3A, 4A, and 5A, one or more of the functions described with respect to the processes (300A, 400A, or 500A) may be performed with the use of a software application, such as a mobile application (e.g., a mobile application that includes a chat messaging application). In some non-limiting embodiments, user device 104 may include a client-side application of the mobile application and secure message system 102 may include a server-side application of the mobile application.

In some non-limiting embodiments, a user (e.g., a user associated with user device 104) may use the mobile application to communicate with other users by sending textual-based or multimedia-based messages. Communication may occur within a group context (chat with individual members associated). Messages within a group context may not be persisted locally by the mobile application, thus an internet connection may be used to facilitate the communication and the systems, methods, and computer program products described herein for authenticated message encryption and decryption.

In some non-limiting embodiments, the mobile application (e.g., the chat messaging application) may use an internet connection when messaging and may not, in some instances, support offline use. In some non-limiting embodiments, internet connectivity for communication may circumvent advisories from using offline or local data to decrypt messages without proper authorization and may allow secure message system 102 to ascertain near-realtime control to deny access to either the shared secret or to the encrypted messages themselves.

In some non-limiting embodiments, messages communicated over the mobile application may not be persisted in plaintext and decryption may use authorized facilitated communication between multiple systems, such that any one system may not perform the decryption of a message. In some non-limiting embodiments, messages may be encrypted with an Authenticated Encryption Authenticated Decryption (AEAD) mode.

In some non-limiting embodiments, the mobile application may decentralize where the encrypted messages and the associated shared chat secrets are stored. This may cause a larger attack vector to be needed in order to successfully breach and decrypt the encrypted messages. In some non-limiting embodiments, a secret for decrypting the shared chat secret may reside in the Vault (e.g., KMS 108). This may force an advisory to have to compromise the vault (e.g., KMS 108), content API (e.g., part of secure message system 102), and message API (e.g., part of secure message system 102) to successfully breach and decrypt messages at will. In some non-limiting embodiments, using the AEAD encryption scheme for messages may add security by preventing the messages from being forged or tampered.

In some non-limiting embodiments, a user may securely send a message using the mobile application (e.g., the chat messaging application). In some non-limiting embodiments, the user may input text or select a multimedia to be encoded into a message. In some non-limiting embodiments, the mobile application may first acquire the shared chat secret with a Key Wrapping Scheme (KWS). In some non-limiting embodiments, each time the mobile application acquires a shared chat secret (e.g., switching between multiple chats), the mobile application may generate a one-time use ephemeral keypair for a pair-wise integer factorization algorithm (e.g., RSA). In some non-limiting embodiments, the mobile application may send a request to the content API (e.g., secure message system 102), including an authorization header and public key of the ephemeral keypair, to fetch the shared chat secret. In some non-limiting embodiments, the authorization header may identify the user of the mobile application and the user's permissions. In some non-limiting embodiments, once the user is authorized, the content API may pull the encrypted chat secret from the content database and then make an authorized request to the vault to decrypt the encrypted chat secret. In some non-limiting embodiments, once the chat secret is authorized and decrypted, the content API may wrap the decrypted chat secret using the provided public key of the ephemeral keypair. In some non-limiting embodiments, the mobile application may generate a temporary time-limited access token, signed by the vault that authorizes the mobile application to make requests to the message API.

In some non-limiting embodiments, the content API may respond back to the request with the message API access token and the encrypted chat secret. In some non-limiting embodiments, the mobile application may use the private key of the ephemeral keypair to decrypt the shared chat secret. In some non-limiting embodiments, the mobile application may generate a high-entropy content encryption key. In some non-limiting embodiments, the content encryption key may be used to encrypt the message. In some non-limiting embodiments, the mobile application may use the shared chat secret to wrap the content encryption key. In some non-limiting embodiments, the mobile application may concatenate the wrapped content encryption key and encrypted message to provide a concatenated message. The concatenated message may be viable for parsing since the output length of the wrapped content encryption key is constant (e.g., predictable). In some non-limiting embodiments, the mobile application may make a request to the message API with the concatenated message including the generated access token from the content API. In some non-limiting embodiments or aspects, once the access token is authorized, the message API may persist the concatenated message in a message database (e.g., database device 106) and may propagate an event to a push notification service (e.g., part of secure message system 102).

In some non-limiting embodiments, using the ephemeral keypair generated by the mobile application (e.g., client-side, executing on user device 104) to encrypt the shared chat secret on a server (e.g., server-side, secure message system 102) and then decrypt the shared chat secret using the mobile application (e.g., client-side, executing on user device 104) may ensure that the shared chat secret can only be decrypted by the mobile application (e.g., client-side, executing on user device 104) that generated the ephemeral keypair, enabling a safe transit over the internet. In some non-limiting embodiments, enforcing the ephemeral keypair to be a one-time usage may increase security of the mobile application and system (e.g., user device 104 and/or secure message system 102) by reducing leakage of key material over-time and introducing forward-secrecy. In some non-limiting embodiments, the time-limited access token, which may be created by the content API, may be cryptographically verifiable. In some non-limiting embodiments, the access token may grant temporary authorization to the mobile application to make scoped requests to the message API for a small duration of time. This may reduce the time to compromise the access token, and in the event of compromise, it may be valid for a limited duration.

In some non-limiting embodiments, a user may receive a message and decrypt the message over the mobile application. In some non-limiting embodiments, the mobile application may, when the user switches to a chat (e.g., using user device 104 executing the chat messaging application), load one or more historical messages and may begin receiving incoming messages for the chat in near-realtime. In either case, whether loading one or more historical messages or loading a single incoming message, the decryption process may be the same. The difference between loading one or more historical messages or loading a single incoming message may be that a collection of historical messages are fetched versus a single message being fetched using a message identifier provided by the push notification. In some non-limiting embodiments, the mobile application may first acquire the shared chat secret by using the KWS. In some non-limiting embodiments, the mobile application may parse the concatenated messages to get the wrapped content encryption key and the encrypted message. In some non-limiting embodiments, the mobile application may decrypt the wrapped content encryption key using the shared chat secret. In some non-limiting embodiments, the mobile application may decrypt the encrypted message using the content encryption key. In some non-limiting embodiments, the mobile application may generate the original plaintext message as a result of the decryption of the encrypted message.

In some non-limiting embodiments, when receiving an incoming message, the mobile application may receive a push notification containing a unique identifier of the incoming message. In some non-limiting embodiments, the mobile application may not receive the contents of the incoming message for security reasons. In some non-limiting embodiments, the incoming message and the contents of the incoming message may be accessible following additional requests to the message API to fetch the single affected message historically.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method for generating a shared secret for secure chat messaging, comprising:
   receiving, with at least one processor, an application programming interface (API) request for a shared chat secret, wherein the API request comprises a user encryption key of a keypair;
   determining, with at least one processor, whether a user is authorized for a chat messaging application based on the API request, wherein determining whether the user is authorized for the chat messaging application comprises:
      checking access permissions of the user based on a token included in the API request;

transmitting, with at least one processor, a request for an encrypted chat secret based on the API request;

receiving, with at least one processor, the encrypted chat secret;

transmitting, with at least one processor, the encrypted chat secret to a key management system (KMS), wherein the KMS is a hardened KMS such that no encryption keys are exported from the KMS;

receiving, with at least one processor, a chat secret from the KMS, wherein the chat secret is a chat secret that has been generated by decrypting the encrypted chat secret;

wrapping, with at least one processor, the chat secret according to an encryption algorithm using the user encryption key to provide a wrapped chat secret;

generating, with at least one processor, an access token based on a session identifier;

transmitting, with at least one processor, the access token to the KMS;

receiving, with at least one processor, a signed access token from the KMS; and transmitting, with at least one processor, the wrapped chat secret and the signed access token.

2. The method of claim 1, wherein the user encryption key of the keypair is a public key of a public/private encryption keypair, and wherein the method further comprising:

generating public/private encryption keypair for shared secret;

generate the API request for the shared secret, wherein the API request includes the public key of the public/private encryption keypair; and transmitting the API request for the shared secret.

3. The method of claim 2, further comprising:

retrieving the encrypted chat secret based on a chat identifier included in the API request.

4. The method of claim 1, further comprising:

receiving the wrapped chat secret and the signed access token; and decrypting the wrapped chat secret to provide the chat secret.

5. The method of claim 4, wherein the user encryption key of the keypair is a public key of a public/private encryption keypair, and wherein decrypting the wrapped chat secret to provide the chat secret comprises:

decrypting the wrapped chat secret to provide the chat secret using a private key of the public/private encryption keypair.

6. The method of claim 1, further comprising:

determining whether the encrypted chat secret is authorized; and decrypting the encrypted chat secret based on determining that the encrypted chat secret is authorized.

7. The method of claim 1, further comprising:

destroying the keypair following an event associated with a chat session.

8. A system for generating a shared secret for secure chat messaging, comprising:

at least one processor;

wherein the at least one processor is programmed or configured to:

receive an application programming interface (API) request for a shared chat secret, wherein the API request comprises a user encryption key of a keypair;

determine whether a user is authorized for a chat messaging application based on the API request, wherein, when determining whether the user is authorized for the chat messaging application, the at least one processor is programmed or configured to:

check access permissions of the user based on a token included in the API request;

transmit a request for an encrypted chat secret based on the API request;

receive the encrypted chat secret;

transmit the encrypted chat secret to a key management system (KMS), wherein the KMS is a hardened KMS such that no encryption keys are exported from the KMS;

receive a chat secret from the KMS, wherein the chat secret is a chat secret that has been generated by decrypting the encrypted chat secret;

wrap the chat secret according to an encryption algorithm using the user encryption key to provide a wrapped chat secret;

generate an access token based on a session identifier;

transmit the access token to the KMS;

receive a signed access token from the KMS; and transmit the wrapped chat secret and the signed access token.

9. The system of claim 8, wherein the user encryption key of the keypair is a public key of a public/private encryption keypair, and wherein the at least one processor is further programmed or configured to:

generate the public/private encryption keypair for the shared secret;

generate the API request for the shared secret, wherein the API request includes the public key of the public/private encryption keypair; and transmit the API request for the shared secret.

10. The system of claim 8, wherein the at least one processor is further programmed or configured to:

retrieve the encrypted chat secret based on a chat identifier included in the API request.

11. The system of claim 8, wherein the at least one processor is further programmed or configured to:

receive the wrapped chat secret and the signed access token; and decrypt the wrapped chat secret to provide the chat secret.

12. The system of claim 11, wherein the user encryption key of the keypair is a public key of a public/private encryption keypair, and wherein, when decrypting the wrapped chat secret to provide the chat secret, the at least one processor is programmed or configured to:

decrypt the wrapped chat secret to provide the chat secret using a private key of the public/private encryption keypair.

13. The system of claim 8, wherein the at least one processor is further programmed or configured to:

determine whether the encrypted chat secret is authorized; and decrypt the encrypted chat secret based on determining that the encrypted chat secret is authorized.

14. The system of claim 8, wherein the at least one processor is further programmed or configured to:

destroy the keypair following an event associated with a chat session.

15. A computer program product for generating a shared secret for secure chat messaging, the computer program product comprising at least one non-transitory computer-readable medium including one or more instructions that, when executed by at least one processor, cause the at least one processor to:

receive an application programming interface (API) request for a shared chat secret, wherein the API request comprises a user encryption key of a keypair;
determine whether a user is authorized for a chat messaging application based on the API request, wherein, when determining whether the user is authorized for the chat messaging application, the at least one processor is programmed or configured to:
  check access permissions of the user based on a token included in the API request;
transmit a request for an encrypted chat secret based on the API request;
receive the encrypted chat secret;
transmit the encrypted chat secret to a key management system (KMS), wherein the KMS is a hardened KMS such that no encryption keys are exported from the KMS;
receive a chat secret from the KMS, wherein the chat secret is a chat secret that has been generated by decrypting the encrypted chat secret;
wrap the chat secret according to an encryption algorithm using the user encryption key to provide a wrapped chat secret;
generate an access token based on a session identifier;
transmit the access token to the KMS;
receive a signed access token from the KMS; and
transmit the wrapped chat secret and the signed access token.

16. The computer program product of claim 15, wherein the user encryption key of the keypair is a public key of a public/private encryption keypair, and wherein the one or more instructions further cause the at least one processor to:
generate the public/private encryption keypair for the shared secret;
generate the API request for the shared secret, wherein the API request includes the public key of the public/private encryption keypair; and
transmit the API request for the shared secret.

17. The computer program product of claim 15, wherein the one or more instructions further cause the at least one processor to:
retrieve the encrypted chat secret based on a chat identifier included in the API request.

18. The computer program product of claim 15, wherein the one or more instructions further cause the at least one processor to:
receive the wrapped chat secret and the signed access token; and
decrypt the wrapped chat secret to provide the chat secret.

19. The computer program product of claim 18, wherein the user encryption key of the keypair is a public key of a public/private encryption keypair, and wherein, when decrypting the wrapped chat secret to provide the chat secret, the one or more instructions cause the at least one processor to:
decrypt the wrapped chat secret to provide the chat secret using a private key of the public/private encryption keypair.

20. The computer program product of claim 15, wherein the one or more instructions further cause the at least one processor to:
determine whether the encrypted chat secret is authorized; and
decrypt the encrypted chat secret based on determining that the encrypted chat secret is authorized.

21. The computer program product of claim 15, wherein the one or more instructions further cause the at least one processor to:
destroy the keypair following an event associated with a chat session.

22. A method for encrypting a message for secure chat messaging, comprising:
obtaining, with at least one processor, a shared chat secret;
receiving, with at least one processor, a plaintext message;
generating, with at least one processor, a content encryption key for the shared chat secret;
encrypting, with at least one processor, the plaintext message according to a first encryption algorithm using the content encryption key to provide an encrypted message;
wrapping, with at least one processor, the content encryption key according to a second encryption algorithm with the shared chat secret to provide a wrapped content encryption key;
concatenating, with at least one processor, the wrapped content encryption key and the encrypted message to provide a concatenated message; and
transmitting, with at least one processor, an application programming interface (API) request that includes the concatenated message.

23. The method of claim 22, further comprising:
determining whether a user is authorized for a chat messaging application based on an access token included the API request, wherein determining whether the user is authorized for the chat messaging application comprises:
transmitting an authorization request to a key management system (KMS), wherein the authorization request comprises the access token included in the API request.

24. The method of claim 23, further comprising:
verifying a signature of the access token included in the authorization request; and
transmitting an authorization confirmation response based on verifying the signature of the access token.

25. The method of claim 23, further comprising:
authorizing activity for a chat session based on a chat identifier, wherein authorizing activity for the chat session comprises:
reading a token claim of the access token, wherein the token claim comprises a key value pair; and
determining that the activity for the chat session is authorized based on the chat identifier and the key value pair.

26. The method of claim 22, further comprising:
receiving the API request; and
storing the concatenated message based on a chat identifier of the concatenated message and a timestamp associated with the concatenated message.

27. The method of claim 26, further comprising:
transmitting a push notification associated with the concatenated message, wherein the push notification includes a unique identifier associated with the chat identifier of the concatenated message.

28. A system for encrypting a message for secure chat messaging, comprising:
at least one processor;
wherein the at least one processor is programmed or configured to:
obtain a shared chat secret;
receive a plaintext message;

generate a content encryption key for the shared chat secret;

encrypt the plaintext message according to a first encryption algorithm using the content encryption key to provide an encrypted message;

wrap the content encryption key according to a second encryption algorithm with the shared chat secret to provide a wrapped content encryption key;

concatenate the wrapped content encryption key and the encrypted message to provide a concatenated message; and transmit an application programming interface (API) request that includes the concatenated message.

29. The system of claim 28, wherein the at least one processor is further programmed or configured to:

determine whether a user is authorized for a chat messaging application based on an access token included the API request, wherein, when determining whether the user is authorized for the chat messaging application, the at least one processor is programmed or configured to:

transmit an authorization request to a key management system (KMS), wherein the authorization request comprises the access token included in the API request.

30. The system of claim 29, wherein the at least one processor is further programmed or configured to:

verify a signature of the access token included in the authorization request; and transmit an authorization confirmation response based on verifying the signature of the access token.

31. The system of claim 29, wherein the at least one processor is further programmed or configured to:

authorize activity for a chat session based on a chat identifier, wherein, when authorizing activity for the chat session, the at least one processor is programmed or configured to:

read a token claim of the access token, wherein the token claim comprises a key value pair; and determine that the activity for the chat session is authorized based on the chat identifier and the key value pair.

32. The system of claim 28, wherein the at least one processor is further programmed or configured to:

receive the API request; and store the concatenated message based on a chat identifier of the concatenated message and a timestamp associated with the concatenated message.

33. The system of claim 32, wherein the at least one processor is further programmed or configured to:

transmit a push notification associated with the concatenated message, wherein the push notification includes a unique identifier associated with the chat identifier of the concatenated message.

34. A computer program product for encrypting a message for secure chat messaging, the computer program product comprising at least one non-transitory computer-readable medium including one or more instructions that, when executed by at least one processor, cause the at least one processor to:

obtain a shared chat secret;

receive a plaintext message;

generate a content encryption key for the shared chat secret;

encrypt the plaintext message according to a first encryption algorithm using the content encryption key to provide an encrypted message;

wrap the content encryption key according to a second encryption algorithm with the shared chat secret to provide a wrapped content encryption key;

concatenate the wrapped content encryption key and the encrypted message to provide a concatenated message; and transmit an application programming interface (API) request that includes the concatenated message.

35. The computer program product of claim 34, wherein the one or more instructions further cause the at least one processor to:

determine whether a user is authorized for a chat messaging application based on an access token included the API request, wherein, when determining whether the user is authorized for the chat messaging application, the one or more instructions cause the at least one processor to:

transmit an authorization request to a key management system (KMS), wherein the authorization request comprises the access token included in the API request.

36. The computer program product of claim 35, wherein the one or more instructions further cause the at least one processor to:

verify a signature of the access token included in the authorization request; and transmit an authorization confirmation response based on verifying the signature of the access token.

37. The computer program product of claim 35, wherein the one or more instructions further cause the at least one processor to:

authorize activity for a chat session based on a chat identifier, wherein, when authorizing activity for the chat session, the one or more instructions cause the at least one processor to:

read a token claim of the access token, wherein the token claim comprises a key value pair; and determine that the activity for the chat session is authorized based on the chat identifier and the key value pair.

38. The computer program product of claim 34, wherein the one or more instructions further cause the at least one processor to:

receive the API request; and store the concatenated message based on a chat identifier of the concatenated message and a timestamp associated with the concatenated message.

39. The computer program product of claim 38, wherein the one or more instructions further cause the at least one processor to:

transmit a push notification associated with the concatenated message, wherein the push notification includes a unique identifier associated with the chat identifier of the concatenated message.

40. A method for decrypting a message for secure chat messaging, comprising:

obtaining, with at least one processor, a shared chat secret;

receiving a message notification associated with an encrypted message, wherein the message notification includes a unique identifier associated with the encrypted message;

transmitting, with at least one processor, a message request, wherein the message request includes the unique identifier associated with the encrypted message;

receiving, with at least one processor, a concatenated message based on the message request;

parsing, with at least one processor, the concatenated message to provide an encrypted message and a wrapped content encryption key;

unwrapping, with at least one processor, the wrapped content encryption key according to a first encryption algorithm with the shared chat secret to provide an unwrapped content encryption key; and decrypting, with at least one processor, the encrypted message according to a second encryption algorithm using the unwrapped content encryption key to provide a plaintext message.

41. The method of claim 40, further comprising:
verifying a signature of an access token included in the message request; and
transmitting an authorization confirmation response based on verifying the signature of the access token.

42. The method of claim 40, further comprising:
processing the plaintext message.

43. The method of claim 40, further comprising:
authorizing activity for a chat session based on the unique identifier associated with the encrypted message, wherein authorizing activity for the chat session comprises:
reading a token claim of an access token included in the message request, wherein the token claim comprises a key value pair; and
determining that the activity for the chat session is authorized based on the unique identifier and the key value pair.

44. The method of claim 43, wherein authorizing the activity for the chat session comprises:
authorizing, with at least one processor of a messaging application programming interface (API) server, the activity for the chat session.

45. The method of claim 40, wherein receiving the message notification associated with the encrypted message comprises:
receiving the message notification associated with the encrypted message from a notification application programming interface (API) server.

46. The method of claim 40, further comprising:
retrieving the concatenated message from a database based on a chat identifier of the concatenated message, the unique identifier associated with the encrypted message, or any combination thereof.

47. A system for decrypting a message for secure chat messaging, comprising:
at least one processor;
wherein the at least one processor is programmed or configured to:
obtain a shared chat secret;
receive a message notification associated with an encrypted message, wherein the message notification includes a unique identifier associated with the encrypted message;
transmit a message request, wherein the message request includes the unique identifier associated with the encrypted message;
receive a concatenated message based on the message request;
parse the concatenated message to provide an encrypted message and a wrapped content encryption key;
unwrap the wrapped content encryption key according to a first encryption algorithm with the shared chat secret to provide an unwrapped content encryption key; and
decrypt the encrypted message according to a second encryption algorithm using the unwrapped content encryption key to provide a plaintext message.

48. The system of claim 47, wherein the at least one processor is further programmed or configured to:
verify a signature of an access token included in the message request; and
transmit an authorization confirmation response based on verifying the signature of the access token.

49. The system of claim 47, wherein the at least one processor is further programmed or configured to:
process the plaintext message.

50. The system of claim 47, wherein the at least one processor is further programmed or configured to:
authorize activity for a chat session based on the unique identifier associated with the encrypted message, wherein, when authorizing activity for the chat session, the at least one processor is programmed or configured to:
read a token claim of an access token included in the message request, wherein the token claim comprises a key value pair; and
determine that the activity for the chat session is authorized based on the unique identifier and the key value pair.

51. The system of claim 50, wherein, when authorizing the activity for the chat session, the at least one processor is programmed or configured to:
authorize, with at least one processor of a messaging application programming interface (API) server, the activity for the chat session.

52. The system of claim 47, wherein, when receiving the message notification associated with the encrypted message, the at least one processor is programmed or configured to:
receive the message notification associated with the encrypted message from a notification application programming interface (API) server.

53. The system of claim 47, wherein the at least one processor is further programmed or configured to:
retrieve the concatenated message from a database based on a chat identifier of the concatenated message, the unique identifier associated with the encrypted message, or any combination thereof.

54. A computer program product for decrypting a message for secure chat messaging, the computer program product comprising at least one non-transitory computer-readable medium including one or more instructions that, when executed by at least one processor, cause the at least one processor to:
obtaining a shared chat secret;
receive a message notification associated with an encrypted message, wherein the message notification includes a unique identifier associated with the encrypted message;
transmit a message request, wherein the message request includes the unique identifier associated with the encrypted message;
receive a concatenated message based on the message request;
parse the concatenated message to provide an encrypted message and a wrapped content encryption key;
unwrap the wrapped content encryption key according to a first encryption algorithm with the shared chat secret to provide an unwrapped content encryption key; and
decrypt the encrypted message according to a second encryption algorithm using the unwrapped content encryption key to provide a plaintext message.

55. The computer program product of claim 54, wherein the one or more instructions further cause the at least one processor to:
- verify a signature of an access token included in the message request; and
- transmit an authorization confirmation response based on verifying the signature of the access token.

56. The computer program product of claim 54, wherein the one or more instructions further cause the at least one processor to:
- process the plaintext message.

57. The computer program product of claim 54, wherein the one or more instructions further cause the at least one processor to:
- authorize activity for a chat session based on the unique identifier associated with the encrypted message, wherein authorizing activity for the chat session comprises:
  - read a token claim of an access token included in the message request, wherein the token claim comprises a key value pair; and
  - determine that the activity for the chat session is authorized based on the unique identifier and the key value pair.

58. The computer program product of claim 57, wherein, when authorizing the activity for the chat session, the one or more instructions cause the at least one processor to:
- authorize, with at least one processor of a messaging application programming interface (API) server, the activity for the chat session.

59. The computer program product of claim 54, wherein, when receiving the message notification associated with the encrypted message, the one or more instructions cause the at least one processor to:
- receive the message notification associated with the encrypted message from a notification messaging application programming interface (API) server.

60. The computer program product of claim 54, wherein the one or more instructions further cause the at least one processor to:
- retrieve the concatenated message from a database based on a chat identifier of the concatenated message, the unique identifier associated with the encrypted message, or any combination thereof.

* * * * *